(12) United States Patent
Hayata

(10) Patent No.: US 8,752,950 B2
(45) Date of Patent: *Jun. 17, 2014

(54) INKJET INK COMPOSITION, INKJET RECORDING METHOD, AND PRINTED MATERIAL

(75) Inventor: Yuuichi Hayata, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 233 days.

This patent is subject to a terminal disclaimer.

(21) Appl. No.: 13/191,135

(22) Filed: Jul. 26, 2011

(65) Prior Publication Data

US 2012/0026235 A1 Feb. 2, 2012

(30) Foreign Application Priority Data

Jul. 27, 2010 (JP) ................... 2010-168535
Jul. 29, 2010 (JP) ................... 2010-170348
Dec. 7, 2010 (JP) ................... 2010-272818
Jul. 1, 2011 (JP) ................... 2011-146967

(51) Int. Cl.
*B41J 2/01* (2006.01)
*C09D 11/10* (2014.01)

(52) U.S. Cl.
CPC .................. *C09D 11/101* (2013.01)
USPC ....................................... 347/100

(58) Field of Classification Search
USPC ........................................ 347/100
See application file for complete search history.

(56) References Cited

U.S. PATENT DOCUMENTS

| 4,680,058 | A * | 7/1987 | Shimizu et al. ............ 106/31.65 |
| 2002/0171725 | A1 * | 11/2002 | Ouchi et al. ................ 347/100 |
| 2003/0112307 | A1 * | 6/2003 | Maeda et al. ............... 347/102 |
| 2003/0231234 | A1 * | 12/2003 | Ushirogouchi et al. ...... 347/100 |
| 2008/0225099 | A1 | 9/2008 | Eytan et al. |
| 2008/0316244 | A1 | 12/2008 | Elena et al. |
| 2009/0176072 | A1 | 7/2009 | Jeremy et al. |
| 2009/0289973 | A1 * | 11/2009 | Makuta et al. .................... 347/9 |
| 2009/0318580 | A1 * | 12/2009 | Nakano et al. ................ 522/148 |
| 2013/0016166 | A1 * | 1/2013 | Hayata ........................... 347/102 |

FOREIGN PATENT DOCUMENTS

| JP | 2009-67963 A | 4/2009 |
| JP | 2009-534514 A | 9/2009 |
| JP | 2009-534515 A | 9/2009 |
| JP | 2010-70692 A | 4/2010 |
| JP | 2010-111716 A | 5/2010 |
| JP | 2010-111795 A | 5/2010 |
| JP | 2010-521330 A | 6/2010 |
| JP | 2010-184996 A | 8/2010 |
| JP | 2010-527394 A | 8/2010 |
| WO | 2007/125273 A1 | 11/2007 |
| WO | 2007/129017 A1 | 11/2007 |
| WO | 2008/074589 A1 | 6/2008 |
| WO | 2008/139188 A1 | 11/2008 |
| WO | 2009/045703 A1 | 4/2009 |
| WO | WO 2009045703 A1 * | 4/2009 | ............ C09D 11/02 |
| WO | 2009/074833 A1 | 6/2009 |
| WO | 2010/079341 A1 | 7/2010 |
| WO | 2010/150023 A2 | 12/2010 |
| WO | 2011/027162 A1 | 3/2011 |

OTHER PUBLICATIONS

Partial European Search Report dated Oct. 7, 2011.

* cited by examiner

*Primary Examiner* — Laura Martin
(74) *Attorney, Agent, or Firm* — Sughrue Mion, PLLC

(57) ABSTRACT

An inkjet ink composition is provided that includes (Component 1-A) an N-vinyllactam, (Component 1-B) a compound represented by Formula (1), and (Component 1-C) at least one compound selected from the group consisting of a bisacylphosphine compound, a thioxanthone compound, a thiochromanone compound, and an α-aminoketone compound, the inkjet ink composition either not comprising a silicone-based surfactant or a fluorine-based surfactant or comprising a silicone-based surfactant and a fluorine-based surfactant at a total content of greater than 0 wt % but no greater than 0.03 wt % relative to the entire weight of the inkjet ink composition.

There are also provided an inkjet ink composition that includes (Component 2-A) the di(meth)acrylate of a hydrocarbon diol having 5 to 10 carbons at 3 to 35 wt %, (Component 2-B) a compound represented by Formula (1) at 35 to 70 wt %, and (Component 2-C) a polymerization initiator, the inkjet ink composition having a total content of Component 2-A and Component 2-B of 50 to 90 wt %, and a surface tension at 25° C. of 33 to 37.5 mN/m.

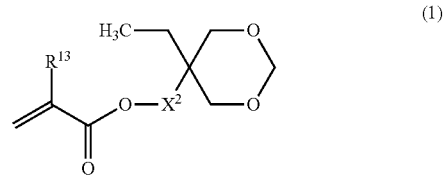

(1)

24 Claims, No Drawings

INKJET INK COMPOSITION, INKJET RECORDING METHOD, AND PRINTED MATERIAL

BACKGROUND OF THE INVENTION

1. Field of the Invention

The present invention relates to an inkjet ink composition, an inkjet recording method, and a printed material.

2. Description of the Related Art

As image recording methods for forming an image on a recording medium such as paper based on an image data signal, there are an electrophotographic system, sublimation type and melt type thermal transfer systems, an inkjet system, etc.

With regard to the inkjet system, the printing equipment is inexpensive, it is not necessary to use a plate when printing, and since an image is formed directly on a recording medium by discharging an ink composition only on a required image area, the ink composition can be used efficiently and the running cost is low, particularly in the case of small lot production. Furthermore, there is little noise and it is excellent as an image recording system, and has been attracting attention in recent years.

Among them, an inkjet recording ink composition (radiation-curing inkjet recording ink composition), which is curable upon exposure to radiation such as UV rays, is an excellent system from the viewpoint of it being possible to print on various types of recording media because, compared with a solvent-based ink composition, the drying properties are excellent and an image is resistant to spreading since the majority of the components in the ink composition cure upon exposure to radiation such as UV rays. Examples of a conventional ink composition for inkjet recording are described in Published Japanese translation of PCT application No. 2009-534514, Published Japanese translation of PCT application No. 2009-534515, JP-A-2009-67963 (JP-A denotes a Japanese unexamined patent application publication), JP-A-2010-184996, Published Japanese translation of PCT application No. 2010-527394, International Patent Application WO 2010/079341, International Patent Application WO 2009/074833, and International Patent Application WO 2009/045703.

It is an object of the present invention to provide an inkjet ink composition that can give a printed material having inconspicuous stripe unevenness and excellent surface gloss, and an inkjet recording method and a printed material employing the inkjet ink composition.

Means for Solving the Problems

The object of the present invention has been attained by means described in <1>, <12>, <13>, <14>, <22>, and <24>. They are described below together with <2> to <11>, <15> to <21>, and <23>, which are preferred embodiments.

<1> An inkjet ink composition comprising (Component 1-A) an N-vinyllactam, (Component 1-B) a compound represented by Formula (1), and (Component 1-C) at least one compound selected from the group consisting of a bisacylphosphine compound, a thioxanthone compound, a thiochromanone compound, and an α-aminoketone compound, the inkjet ink composition either not comprising a silicone-based surfactant or a fluorine-based surfactant or comprising a silicone-based surfactant and a fluorine-based surfactant at a total content of greater than 0 wt % but no greater than 0.03 wt % relative to the entire weight of the inkjet ink composition,

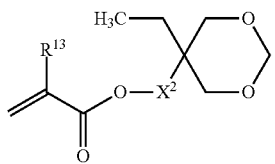

wherein $R^{13}$ denotes a hydrogen atom or a methyl group, and $X^2$ denotes a single bond or a divalent linking group, <2> the inkjet ink composition according to <1> above, wherein the inkjet ink composition further comprises (Component 1-D) a compound represented by Formula (2),

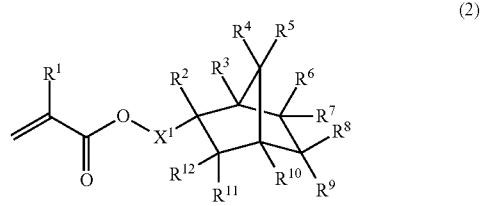

wherein $R^1$ denotes a hydrogen atom or a methyl group, $X^1$ denotes a single bond or a divalent linking group, and $R^2$ to $R^{12}$ independently denote a hydrogen atom or an alkyl group, <3> the inkjet ink composition according to <2> above, wherein Component 1-D is isobornyl (meth)acrylate, <4> the inkjet ink composition according to any one of <1> to <3> above, wherein the inkjet ink composition further comprises (Component 1-E) a (meth)acrylate compound having a chain-form hydrocarbon group having 8 to 13 carbons, <5> the inkjet ink composition according to any one of <1> to <4> above, wherein Component 1-B is cyclic trimethylolpropane formal (meth)acrylate, <6> the inkjet ink composition according to any one of <1> to <5> above, wherein the inkjet ink composition has a content of Component 1-A of 3 to 35 wt % relative to the entire weight of the inkjet ink composition, <7> the inkjet ink composition according to <2> or <3> above, wherein the inkjet ink composition has a content of Component 1-D of at least 13 wt % but no greater than 55 wt % relative to the entire weight of the inkjet ink composition, <8> the inkjet ink composition according to <2> or <3> above, wherein the inkjet ink composition has a content of Component 1-D of at least 1 wt % but less than 13 wt % relative to the entire weight of the inkjet ink composition, <9> the inkjet ink composition according to any one of <1> to <8> above, wherein the inkjet ink composition further comprises (Component 1-F) an oligomer, <10> the inkjet ink composition according to any one of <1> to <9> above, wherein the inkjet ink composition either does not comprise a silicone-based surfactant or a fluorine-based surfactant or comprises a silicone-based surfactant and a fluorine-based surfactant at a total content of greater than 0 wt % but no greater than 0.005 wt % relative to the entire weight of the inkjet ink composition, <11> the ink composition according to any one of <1> to <10> above, wherein the inkjet ink composition has a content of polyfunctional (meth)acrylate compound of 3 to 25 wt % relative to the entire weight of the inkjet ink composition, <12> an inkjet recording method comprising ($a^1$) a step pf discharging the inkjet ink composition according to any one of <1> to <11> above onto a recording medium and ($b^1$) a step of curing the inkjet ink composition by irradiating the discharged inkjet ink composition with actinic radiation, <13> a printed material formed using the inkjet recording method according to <12> above, <14> an inkjet ink composition comprising (Component 2-A) the di(meth)acrylate of a hydrocarbon diol having 5 to 10 carbons at 3 to 35 wt %, (Component 2-B) a compound represented by Formula (1) at 35 to 70 wt %, and (Component 2-C) a polymerization initiator, the inkjet ink composition having a total content of Component 2-A and Component 2-B of 50 to 90 wt %, and a surface tension at 25° C. of 33 to 37.5 mN/m,

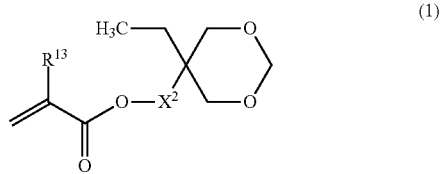

wherein $R^{13}$ denotes a hydrogen atom or a methyl group, and $X^2$ denotes a single bond or a divalent linking group, <15> the inkjet ink composition according to <14> above, wherein the inkjet ink composition either does not comprise a silicone-based surfactant or a fluorine-based surfactant or comprises a silicone-based surfactant and a fluorine-based surfactant at a total content of less than 0.01 wt % relative to the entire weight of the inkjet ink composition, <16> the inkjet ink composition according to <14> or <15> above, wherein the inkjet ink composition further comprises (Component 2-D) a polyfunctional vinyl ether compound, <17> the inkjet ink composition according to any one of <14> to <16> above, wherein Component 2-A comprises the di(meth)acrylate of a hydrocarbon diol having a branched structure having 5 to 10 carbons, <18> the inkjet ink composition according to any one of <14> to <17> above, wherein Component 2-A comprises 3-methyl-1,5-pentanediol diacrylate, <19> the inkjet ink composition according to any one of <14> to <18> above, wherein Component 2-B comprises cyclic trimethylolpropane formal acrylate, <20> the inkjet ink composition according to any one of <14> to <19> above, wherein the inkjet ink composition further comprises (Component 2-E) a monofunctional (meth)acrylate compound having a chain-form hydrocarbon group having 8 to 13 carbons, <21> the inkjet ink composition according to any one of <14> to <20> above, wherein the inkjet ink composition further comprises (Component 2-F) an N-vinyllactam, <22> an inkjet recording method comprising ($a^1$) a step of discharging the inkjet ink composition according to any one of <14> to <21> above onto a recording medium and ($b^1$) a step of curing the inkjet ink composition by irradiating the discharged inkjet ink composition with actinic radiation, <23> the inkjet recording method according to <22> above, wherein steps ($a^1$) and ($b^1$) are carried out at least twice for the same area on the recording medium, and <24> a printed material formed using the inkjet recording method according to <22> or <23> above.

Mode for Carrying out the Invention

The present invention is explained in detail below.
(Inkjet Ink Composition)

The inkjet ink composition of the present invention (hereinafter, also called the 'ink composition') can give a printed material having inconspicuous stripe unevenness and excellent surface gloss by satisfying a first embodiment or a second embodiment described below.

The inkjet ink composition in the first embodiment of the present invention comprises (Component 1-A) an N-vinyllactam, (Component 1-B) a compound represented by Formula (1), and (Component 1-C) at least one compound selected from the group consisting of a bisacylphosphine compound, a thioxanthone compound, a thiochromanone compound, and an α-aminoketone compound, the inkjet ink composition either not comprising a silicone-based surfactant or a fluorine-based surfactant or comprising a silicone-based surfactant and a fluorine-based surfactant at a total content of greater than 0 wt % but no greater than 0.03 wt % relative to the entire weight of the inkjet ink composition.

The ink composition of the present invention can give a printed material having inconspicuous stripe unevenness and excellent surface gloss. Examples of the substrate include in particular a polyethylene terephthalate (PET) substrate and an acrylic resin (Acryl) substrate.

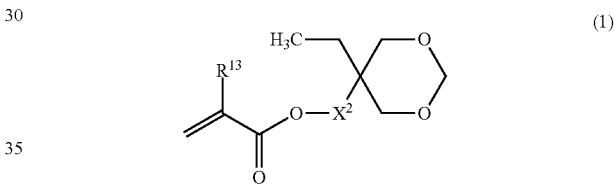

(In the Formula, $R^{13}$ denotes a hydrogen atom or a methyl group, and $X^2$ denotes a single bond or a divalent linking group.)

The inkjet ink composition in the second embodiment of the present invention comprises (Component 2-A) the di(meth)acrylate of a hydrocarbon diol having 5 to 10 carbons at 3 to 35 wt %, (Component 2-B) a compound represented by Formula (1) at 35 to 70 wt %, and (Component 2-C) a polymerization initiator, the inkjet ink composition comprising Component 2-A and Component 2-B at a total content of 50 to 90 wt % and having a surface tension at 25° C. of 33 to 37.5 mN/m.

Furthermore, in accordance with the inkjet ink composition in the second embodiment of the present invention, an image having inconspicuous stripe unevenness and excellent surface gloss and flexibility can be obtained.

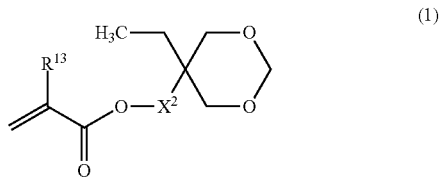

(In the Formula, $R^{13}$ denotes a hydrogen atom or a methyl group, and $X^2$ denotes a single bond or a divalent linking group.)

In the present specification, 'A to B', which expresses a numerical range, has the same meaning as 'at least A but no greater than B'. Furthermore, '(Component 1-A) an N-vinyllactam' is also called simply 'Component 1-A'.

The ink composition of the present invention is an oil-based ink composition that is curable upon exposure to actinic radiation.

The 'actinic radiation' referred to in the present invention is radiation that can provide energy that enables an initiating species to be generated in the ink composition when irradiated, includes α rays, γ rays, X rays, ultraviolet rays, visible light, and an electron beam. Among these, ultraviolet rays and an electron beam are preferable from the viewpoint of curing sensitivity and the availability of equipment, and ultraviolet rays are more preferable.

It is said that, compared with a printed material obtained by aqueous inkjet printing or solvent inkjet printing, in the case of a printed material obtained by actinic radiation-curing type inkjet printing a cured film has low surface gloss and inconspicuous stripe unevenness. It is thought that one of main causes therefor is the shape of a fired droplet when landing being retained since the fired droplet is cured by actinic radiation immediately after landing of the inkjet.

On the other hand, the ink composition of the present invention gives an inkjet image that has excellent printed material surface gloss and little stripe unevenness. Although the reason therefor is not certain, it is thought that the discharged ink composition comprising an N-vinyllactam or a di(meth)acrylate of a hydrocarbon diol having 5 to 10 carbons, and a compound represented by the formula (1) cures from an inner part of a fired droplet by irradiation with actinic radiation immediately after landing. By the existence of the compound represented by the formula (1) in particular, which is expected to have a high dissolved oxygen content, preferably the compound represented by the formula (1) and a compound represented by the formula (2) below, only the fired droplet outermost surface is selectively subjected to oxygen polymerization inhibition, the outermost surface of the fired droplet is kept in a liquid state for a long period of time, the fired droplet outermost surface spreads while wet, and coalescing is promoted. It is surmised that, as a result, a smoother level surface is formed and an image having a high degree of surface gloss and little stripe unevenness is obtained. In particular, when printing in a multipass mode in which the same area is printed by overstriking, there is a case in which a fired droplet is overlayered on a previously fired liquid droplet during overstriking. In this process, it is thought that if the outermost surface of the ink film of the previously fired droplet is in a liquid state, the degree of spreading while wet of the subsequently fired droplet increases, and higher surface gloss is obtained.

When controlling the cured state of a fired droplet, it is important to maintain only the very outermost surface of the fired droplet in a liquid state. If the interior of the fired droplet is kept in a liquid state for a long period of time, a final printed material might become tacky, or a subsequently fired droplet might enter the film interior when overstriking, thus forming a crater-like recess in a printed material. As a result, the smoothness of a printed material surface might be undesirably lost. Furthermore, it is thought that low curability of the interior might cause interference between fired droplets (the position of fired droplets being displaced due to overlapping of the fired droplets), thus accentuating stripe unevenness.

It is though that, in accordance with the present invention, since the combination of an N-vinyllactam, a di(meth)acrylate of a hydrocarbon diol having 5 to 10 carbons, and a compound represented by the formula (1) makes it possible to selectively maintain only the cured film outermost surface in a liquid state for a long period of time while strongly promoting the curability of the interior of a fired droplet, a printed material having high surface gloss and little stripe unevenness is obtained.

At first, the inkjet ink composition in the first embodiment of the present invention is described in detail.

(Component 1-A) N-Vinylcaprolactam

The ink composition of the present invention comprises (Component 1-A) N-vinylcaprolactam. Component 1-A is preferably a compound represented by Formula (A).

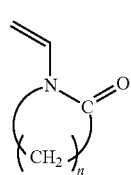

(A)

In Formula (A), n denotes an integer of 2 to 6; n is preferably an integer of 3 to 6 from the viewpoint of flexibility after the ink composition is cured, adhesion to a recording medium, and ready availability of starting materials, n is more preferably 3 or 5, and n is particularly preferably 5, which is N-vinylcaprolactam. N-vinylcaprolactam is preferable since it has excellent safety, is commonly used and is readily available at a relatively low price, and gives particularly good ink curability and adhesion of a cured film to a recording medium.

The N-vinyllactam may have a substituent such as an alkyl group or an aryl group on the lactam ring, and may have a saturated or unsaturated ring structure bonded to the lactam ring.

Component 1-A may be used singly or in a combination of two or more compounds.

The content of Component 1-A is, relative to the total weight of the ink composition, preferably 3 to 35 wt %, more preferably 3 to 30 wt %, yet more preferably 8 to 24 wt %, particularly preferably 9 to 20 wt %, and most preferably 10 to 18 wt %. When in the above-mentioned range, the cured film outermost surface alone can be selectively maintained in a liquid state for a long period of time while strongly promoting the curability of the interior of the image, and a printed material having high surface gloss and little stripe unevenness is obtained.

(Component 1-B) Compound Represented by Formula (1)

The ink composition of the present invention comprises (Component 1-B) a compound represented by Formula (1).

Due to the ink composition of the present invention comprising Component 1-B, an image having excellent surface gloss and little stripe unevenness is obtained, and substrate adhesion toward polyethylene terephthalate (PET) or an acrylic resin is excellent.

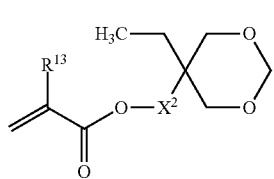

(1)

(In Formula (1), $R^{13}$ denotes a hydrogen atom or a methyl group, and $X^2$ denotes a single bond or a divalent linking group.)

The compound represented by Formula (1) may be an acrylate compound or a methacrylate compound, but is preferably an acrylate compound, that is, $R^{13}$ is a hydrogen atom.

The divalent linking group denoted by $X^2$ in Formula (1) is not particularly limited as long as the effects of the present invention are not greatly impaired; it is preferably a divalent hydrocarbon group or a divalent group in which a hydrocarbon group and an ether bond are combined, and is more preferably a divalent hydrocarbon group, a poly(alkyleneoxy) group, or a poly(alkyleneoxy)alkyl group. Furthermore, the number of carbons of the divalent linking group is preferably 1 to 60, and more preferably 1 to 20.

$X^2$ in Formula (1) is preferably a single bond, a divalent hydrocarbon group, or a divalent group in which a hydrocarbon group and an ether bond are combined, more preferably a divalent hydrocarbon group having 1 to 20 carbons, yet more preferably a divalent hydrocarbon group having 1 to 8 carbons, and particularly preferably a methylene group.

Specific preferred examples of compounds represented by Formula (1) include, but of course are not limited to, compounds (C-1) to (C-4) shown below.

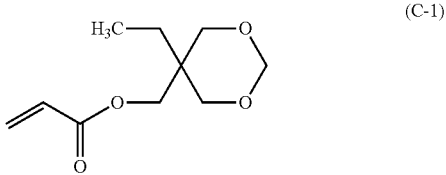
(C-1)

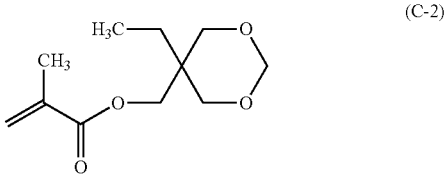
(C-2)

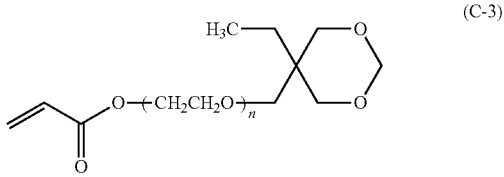
(C-3)

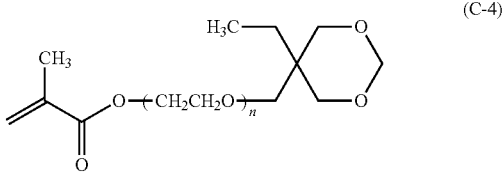
(C-4)

n = 1~30

Among them, cyclic trimethylolpropane formal acrylate (C-1) and cyclic trimethylolpropane formal methacrylate (C-2) are preferable, and cyclic trimethylolpropane formal acrylate (C-1) is particularly preferable.

The content of the compound represented by Formula (1) in the ink composition of the present invention is preferably 3 to 70 wt % relative to the entire weight of the ink composition, more preferably at least 5 wt % but less than 60 wt %, yet more preferably at least 7 wt % but less than 55 wt %, and particularly preferably at least 10 wt % but less than 50 wt %. When in the above-mentioned range, a printed material having excellent surface gloss and little stripe unevenness is obtained.

(Component 1-C) at Least One Type of Polymerization Initiator Selected from the Group Consisting of α-Amino Ketone, Thioxanthone Compound, Thiochromanone Compound, and Bisacylphosphine Oxide Compound The ink composition of the present invention comprises (Component 1-C) at least one type of polymerization initiator selected from the group consisting of an α-amino ketone compound, a thioxanthone compound, a thiochromanone compound, and a bisacylphosphine oxide compound. Due to Component C being contained, the ink composition of the present invention has excellent curability and can give an image with suppressed stripe unevenness.

Furthermore, when the content of a compound represented by Formula (2) below in the ink composition of the present invention is 13 to 55 wt % relative to the entire weight of the composition, from the viewpoint of surface gloss it is preferable for the ink composition of the present invention to comprise at least three types of polymerization initiators selected from the group consisting of a bisacylphosphine oxide compound, a thioxanthone compound, a thiochromanone compound, an α-amino ketone compound, an α-hydroxy ketone compound, and a monoacylphosphine oxide compound, it is more preferable for it to comprise a bisacylphosphine oxide compound, an α-amino ketone compound, and a thioxanthone compound or a thiochromanone compound or comprise an α-hydroxy ketone compound, a monoacylphosphine oxide compound, and a thioxanthone compound or a thiochromanone compound, and it is particularly preferable for it to comprise a bisacylphosphine oxide compound, an α-amino ketone compound, and a thioxanthone compound or a thiochromanone compound.

Furthermore, the ink composition of the present invention preferably comprises a thioxanthone compound and/or a thiochromanone compound; more preferably a thioxanthone compound from the viewpoint of cost, and more preferably a thiochromanone compound from the viewpoint of transparency.

When the content of a compound represented by Formula (2) below in the ink composition of the present invention is 13 to 55 wt % relative to the entire weight of the composition, from the viewpoint of surface gloss it is preferable for the ink composition of the present invention to comprise at least two types of polymerization initiators selected from the group consisting of a bisacylphosphine oxide compound, a thioxanthone compound, a thiochromanone compound, and an α-amino ketone compound, it is more preferable for it to comprise at least three types of polymerization initiators selected from the group consisting of a bisacylphosphine oxide compound, a thioxanthone compound, a thiochromanone compound, and an α-amino ketone compound.

The bisacylphosphine oxide compound is not particularly limited; a known compound may be used, and a compound represented by Formula (D-1) below is preferable.

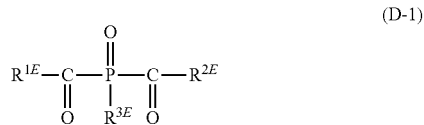
(D-1)

(In Formula (D-1), $R^{1E}$, $R^{2E}$, and $R^{3E}$ independently denote an aromatic hydrocarbon group that may have a methyl group or an ethyl group as a substituent.)

As the bisacylphosphine oxide compound, a known bisacylphosphine oxide compound may be used. Examples thereof include bisacylphosphine oxide compounds described in JP-A-3-101686, JP-A-5-345790, and JP-A-6-298818.

Specific examples thereof include bis(2,6-dichlorobenzoyl)phenylphosphine oxide, bis(2,6-dichlorobenzoyl)-2,5-dimethylphenylphosphine oxide, bis(2,6-dichlorobenzoyl)-4-ethoxyphenylphosphine oxide, bis(2,6-dichlorobenzoyl)-4-propylphenylphosphine oxide, bis(2,6-dichlorobenzoyl)-2-naphthylphosphine oxide, bis(2,6-dichlorobenzoyl)-1-naphthylphosphine oxide, bis(2,6-dichlorobenzoyl)-4-chlorophenylphosphine oxide, bis(2,6-dichlorobenzoyl)-2,4-dimethoxyphenylphosphine oxide, bis(2,6-dichlorobenzoyl) decylphosphine oxide, bis(2,6-dichlorobenzoyl)-4-octylphenylphosphine oxide, bis(2,4,6-trimethylbenzoyl) phenylphosphine oxide, bis(2,4,6-trimethylbenzoyl)-2,5-dimethylphenylphosphine oxide, bis(2,6-dichloro-3,4,5-trimethoxybenzoyl)-2,5-dimethylphenylphosphine oxide, bis(2,6-dichloro-3,4,5-trimethoxybenzoyl)-4-ethoxyphenylphosphine oxide, bis(2-methyl-1-naphthoyl)-2,5-dimethylphenylphosphine oxide, bis(2-methyl-1-naphthoyl)-4-ethoxyphenylphosphine oxide, bis(2-methyl-1-naphthoyl)-2-naphthylphosphine oxide, bis(2-methyl-1-naphthoyl)-4-propylphenylphosphine oxide, bis(2-methyl-1-naphthoyl)-2,5-dimethylphenylphosphine oxide, bis(2-methoxy-1-naphthoyl)-4-ethoxyphenylphosphine oxide, bis(2-chloro-1-naphthoyl)-2,5-dimethylphenylphosphine oxide, and bis(2,6-dimethoxybenzoyl)-2,4,4-trimethylpentylphosphine oxide.

Among them, the bisacylphosphine oxide compound is preferably bis(2,4,6-trimethylbenzoyl)phenylphosphine oxide (IRGACURE 819: Ciba Specialty Chemicals), bis(2,6-dimethoxybenzoyl)-2,4,4-trimethylpentylphenylphosphine oxide, etc.

The thioxanthone compound is not particularly limited; a known compound may be used, and a compound represented by Formula (D-2) below is preferable.

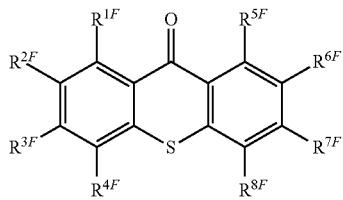

(D-2)

In Formula (D-2) above, $R^{1F}$, $R^{2F}$, $R^{3F}$, $R^{4F}$, $R^{5F}$, $R^{6F}$, $R^{7F}$, and $R^{8F}$ independently denote a hydrogen atom, an alkyl group, a halogen atom, a hydroxy group, a cyano group, a nitro group, an amino group, an alkylthio group, an alkylamino group (The alkylamino group includes the case of monoalkylsubstituted amino group and dialkylsubstituted amino group. It is same also in the following), an alkoxy group, an alkoxycarbonyl group, an acyloxy group, an acyl group, a carboxy group, or a sulfo group. The number of carbon atoms of an alkyl moiety in the alkyl group, alkylthio group, alkylamino group, alkoxy group, alkoxycarbonyl group, acyloxy group, and acyl group is preferably 1 to 20, more preferably 1 to 8, and yet more preferably 1 to 4.

Two of $R^{1F}$, $R^{2F}$, $R^{3F}$, $R^{4F}$, $R^{5F}$, $R^{6F}$, $R^{7F}$, and $R^{8F}$ that are adjacent may be joined to each other to form a ring. When they form a ring, examples of the ring structure include a 5- or 6-membered aliphatic or aromatic ring; it may be a heterocyclic ring containing an element other than a carbon atom, and rings thus formed may be further combined to form a bicyclic ring, for example a fused ring. These ring structures may further have a substituent. Examples of the substituent include a halogen atom, a hydroxy group, a cyano group, a nitro group, an amino group, an alkylthio group, an alkylamino group, an alkoxy group, an alkoxycarbonyl group, an acyloxy group, an acyl group, a carboxy group, and a sulfo group. Examples of a heteroatom when the resulting ring structure is a heterocyclic ring include N, O, and S.

Examples of the thioxanthone compound include thioxanthone, 2-isopropylthioxanthone, 2-chlorothioxanthone, 2-dodecylthioxanthone, 2,4-diethylthioxanthone, 2,4-dimethylthioxanthone, 1-methoxycarbonylthioxanthone, 2-ethoxycarbonylthioxanthone, 3-(2-methoxyethoxycarbonyl)thioxanthone, 4-butoxycarbonylthioxanthone, 3-butoxycarbonyl-7-methylthioxanthone, 1-cyano-3-chlorothioxanthone, 1-ethoxycarbonyl-3-chlorothioxanthone, 1-ethoxycarbonyl-3-ethoxythioxanthone, 1-ethoxycarbonyl-3-aminothioxanthone, 1-ethoxycarbonyl-3-phenylsulfurylthioxanthone, 3,4-di[2-(2-methoxyethoxy)ethoxycarbonyl]thioxanthone, 1-ethoxycarbonyl-3-(1-methyl-1-morpholinoethyl)thioxanthone, 2-methyl-6-dimethoxymethylthioxanthone, 2-methyl-6-(1,1-dimethoxybenzyl)thioxanthone, 2-morpholinomethylthioxanthone, 2-methyl-6-morpholinomethylthioxanthone, n-allylthioxanthone-3,4-dicarboximide, n-octylthioxanthone-3,4-dicarboxylmide, N-(1,1,3,3-tetramethylbutyl)thioxanthone-3,4-dicarboxylmide, 1-phenoxythioxanthone, 6-ethoxycarbonyl-2-methoxythioxanthone, 6-ethoxycarbonyl-2-methylthioxanthone, thioxanthone-2-polyethylene glycol ester, and 2-hydroxy-3-(3,4-dimethyl-9-oxo-9H-thioxanthon-2-yloxy)-N,N,N-trimethyl-1-propanaminium chloride. Among them, from the viewpoint of ready availability and curability, thioxanthone, 2-isopropylthioxanthone, 4-isopropylthioxanthone, 2,3-diethylthioxanthone, 2,4-diethylthioxanthone, 2,4-dichlorothioxanthone, 1-chloro-4-propoxythioxanthone, 2-cyclohexylthioxanthone, 4-cyclohexylthioxanthone, 2-isopropylthioxanthone, and 4-isopropylthioxanthone are preferable, and 2-isopropylthioxanthone and 4-isopropylthioxanthone are more preferable.

The thiochromanone compound is not particularly limited; a known compound may be used, and a compound represented by Formula (D-3) below is preferable.

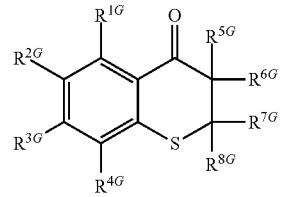

(D-3)

In Formula (D-3), $R^{1G}$, $R^{2G}$, $R^{3G}$, $R^{4G}$, $R^{5G}$, $R^{6G}$, $R^{7G}$, and $R^{8G}$ independently denote a hydrogen atom, an alkyl group, a halogen atom, a hydroxy group, a cyano group, a nitro group, an amino group, an alkylthio group, an alkylamino group, an alkoxy group, an alkoxycarbonyl group, an acyloxy group, an acyl group, a carboxy group, or a sulfo group. The number of carbon atoms of an alkyl moiety of the alkyl group, alkylthio group, alkylamino group, alkoxy group, alkoxycarbonyl group, acyloxy group, and acyl group is preferably 1 to 20, more preferably 1 to 8, and yet more preferably 1 to 4.

Two of $R^{1G}$, $R^{2G}$, $R^{3G}$, and $R^{4G}$ that are adjacent may be bonded to each other, for example fused, to form a ring.

Examples of the ring structure when those above form a ring include a 5 or 6-membered aliphatic ring or aromatic ring; it may be a heterocyclic ring containing an element other than a carbon atom, and rings thus formed may be further combined to form a bicyclic ring, for example a fused ring. These ring structures may further have a substituent. Examples of the substituent include those described for Formula (D-2). Examples of a heteroatom when the resulting ring structure is a heterocyclic ring include N, O, and S.

Furthermore, the thiochromanone compound is preferably a compound having on the thiochromanone ring structure at least one substituent (an alkyl group, a halogen atom, a hydroxy group, a cyano group, a nitro group, an amino group, an alkylthio group, an alkylamino group, an alkoxy group, an alkoxycarbonyl group, an acyloxy group, an acyl group, a carboxy group, a sulfo group, etc.). As examples of the substituent above, an alkyl group, a halogen atom, a hydroxy group, an alkylthio group, an alkylamino group, and an acyloxy group are preferable, an alkyl group, and a halogen atom having 1 to 20 carbon atoms are more preferable, an alkyl group, and a halogen atom having 1 to 4 carbon atoms are yet more preferable.

The thiochromanone compound is preferably a compound having at least one substituent on an aromatic ring and at least one substituent on the thiochromanone ring structure.

The specific examples of the thiochromanone compound preferably include (I-1) to (I-31) listed below. Among them, (I-14), (I-17) and (I-19) is more preferable, and (I-14) is particularly preferable.

(I-1)

(I-2)
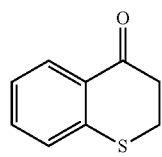

(I-3)
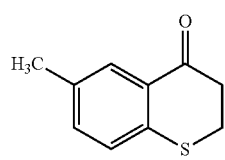

(I-4)
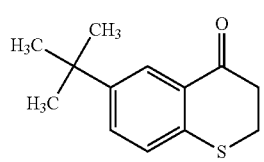

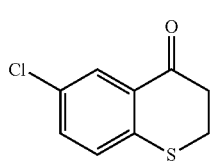

-continued (I-5)
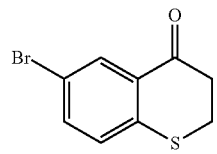

(I-6)
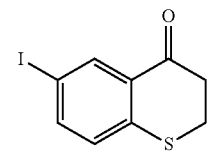

(I-7)
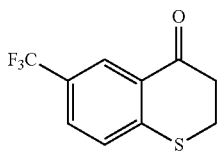

(I-8)
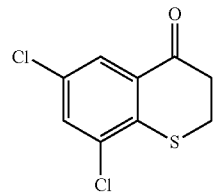

(I-9)
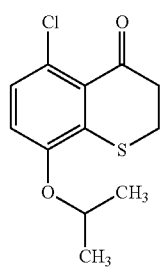

(I-10)
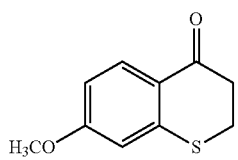

(I-11)
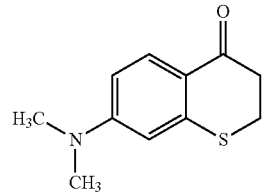

(I-12)
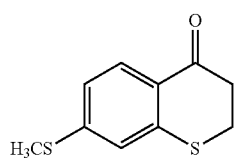

-continued
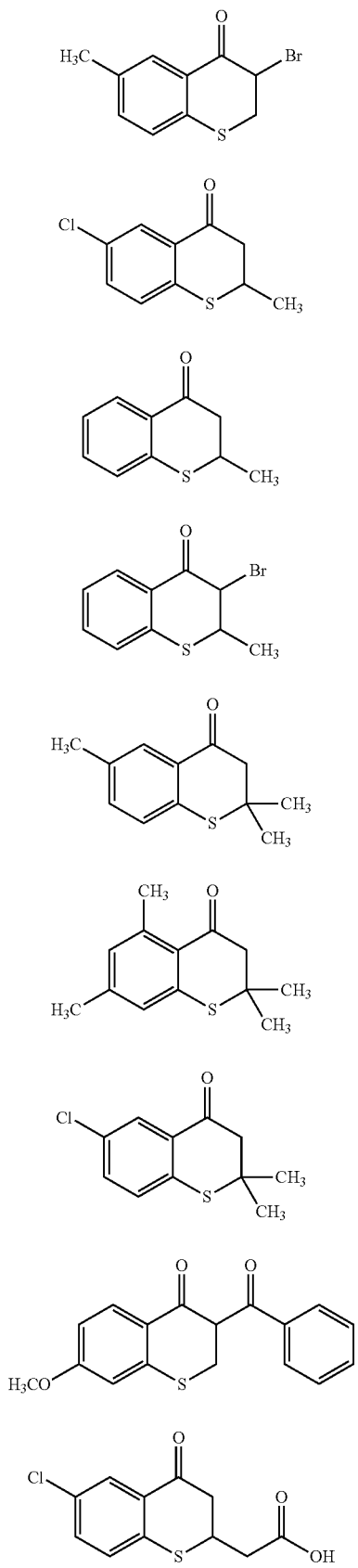
(I-13)
(I-14)
(I-15)
(I-16)
(I-17)
(I-18)
(I-19)
(I-20)
(I-21)
-continued
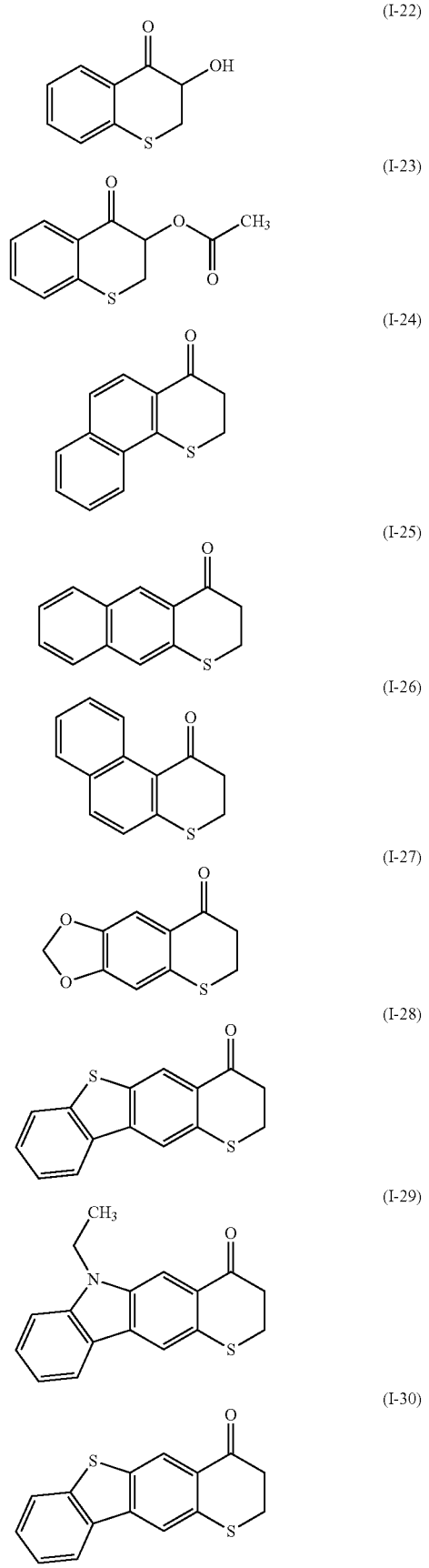
(I-22)
(I-23)
(I-24)
(I-25)
(I-26)
(I-27)
(I-28)
(I-29)
(I-30)

-continued

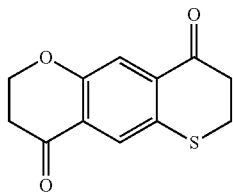
(I-31)

The α-amino ketone compound is not particularly limited; a known compound may be used, and a compound represented by Formula (D-4) below is preferable.

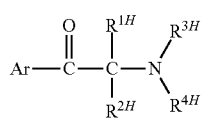
(D-4)

In Formula (D-4) above, Ar denotes a phenyl group that is substituted with —$SR^{13}$ or —$N(R^{7H})(R^{8H})$, $R^{13}$ denotes a hydrogen atom or an alkyl group, $R^{1H}$ and $R^{2H}$ independently denote an alkyl group having 1 to 8 carbon atoms, and $R^{3H}$ and $R^{4H}$ independently denote a hydrogen atom, an alkyl group having 1 to 12 carbon atoms, an alkyl group having 2 to 4 carbon atoms substituted with an alkoxy group having 1 to 4 carbon atoms, or an alkenyl group having 3 to 5 carbon atoms. $R^{1H}$ and $R^{2H}$ may be bonded to each other to form an alkylene group having 2 to 9 carbon atoms. $R^{3H}$ and $R^{4H}$ may be bonded to each other to form an alkylene group having 3 to 7 carbon atoms, and the alkylene group may contain —O— or —$N(R^{12})$— in an alkylene chain. $R^{12}$ denotes an alkyl group having 1 to 4 carbon atoms. $R^{7H}$ and $R^{8H}$ independently denote a hydrogen atom, an alkyl group having 1 to 12 carbon atoms, an alkyl group having 2 to 4 carbon atoms substituted with an alkoxy group having 1 to 4 carbon atoms, or an alkenyl group having 3 to 5 carbon atoms. $R^{7H}$ and $R^{8H}$ may be bonded to each other to form an alkylene group having 3 to 7 carbon atoms, and the alkylene group may contain —O— or —$N(R^{12})$— in an alkylene chain. Here, $R^{12}$ has the same meaning as above.

Examples of the α-amino ketone compound include 2-methyl-1-phenyl-2-morpholinopropan-1-one, 2-methyl-1-[4-(hexyl)phenyl]-2-morpholinopropan-1-one, and 2-ethyl-2-dimethylamino-1-(4-morpholinophenyl)butan-1-one.
Furthermore, a commercial product such as IRGACURE 907, IRGACURE 369, or IRGACURE 379 manufactured by Ciba-Geigy Ltd. can be cited as a preferred example.

The ink composition of the present invention preferably contains a sensitizer in order to promote decomposition of the photopolymerization initiator by absorbing specific actinic radiation.

Examples of the sensitizer include polynuclear aromatic compounds (e.g. pyrene, perylene, triphenylene, 2-ethyl-9,10-dimethoxy anthracene), xanthenes (e.g. fluorescein, eosin, erythrosine, rhodamine B, rose bengal), cyanines (e.g. thiacarbocyanine, oxacarbocyanine), merocyanines (e.g. merocyanine, carbomerocyanine), thiazines (e.g. thionine, methylene blue, toluidine blue), acridines (e.g. acridine orange, chloroflavin, acriflavine), anthraquinones (e.g. anthraquinone), squaryliums (e.g. squarylium), coumarins (e.g. 7-diethylamino-4-methylcoumarin), and thioxanthones (e.g. thioxanthone, 2-isopropyl thioxanthone, 4-isopropyl thioxanthone).

Among them, thioxanthones are preferable.

The sensitizer may be used singly or in a combination of two or more compounds.

From the viewpoint of curability and uniformity of the degree of curing within a cured film, the content of the polymerization initiator in the ink composition of the present invention is preferably 0.01 to 35 wt % relative to the total content of polymerizable compounds, more preferably 0.5 to 20 wt %, and yet more preferably 1.0 to 15 wt %.

When a thioxanthone compound and/or a thiochromanone compound is used, the total content I of the polymerization initiator relative to the total content S of the thioxanthone compound and/or the thiochromanone compound is preferably in the range of I:S=200:1 to 1:200 as a ratio by weight, more preferably 50:1 to 1:50, and yet more preferably 20:1 to 1:5.

Furthermore, when a sensitizer is used, the total content of the polymerization initiator relative to the content of the sensitizer is preferably in the range of 200:1 to 1:200 as a ratio by weight of polymerization initiator:sensitizer, more preferably 50:1 to 1:50, and yet more preferably 20:1 to 1:5.

When a sensitizer is used, from the viewpoint of ink coloration properties, the content of the sensitizer in the ink composition of the present invention is preferably 0.01 to 20 wt % relative to the total weight of the ink composition, more preferably 0.1 to 15 wt %, and yet more preferably 0.5 to 10 wt %.

(Component 1-D) Compound Represented by Formula (2)

The ink composition of the present invention preferably comprises (Component 1-D) a compound represented by Formula (2).

It is preferable for the content of (Component 1-D) the compound represented by Formula (2) to be 13 to 55 wt % relative to the entire weight of the ink composition since the ink composition of the present invention can give a cured film having excellent adhesion to a substrate and also give an image having excellent surface gloss and flexibility and little stripe unevenness.

Furthermore, it is preferable for the content of (Component 1-D) the compound represented by Formula (2) to be at least 1 wt % but less than 13 wt % relative to the entire weight of the ink composition since a printed material having inconspicuous stripe unevenness and excellent surface gloss and antiblocking properties can be obtained.

It is surmised that the blocking phenomenon is caused by a monomolecular component remaining in the interior of a film leaching to the surface over time and resulting in adhesion to a superimposed support. When the content of Component 1-D is at least 1 wt % but less than 13 wt % relative to the entire weight of the ink composition, it is surmised that the ink composition of the present invention has higher curability for the interior, and as a result of reduction of monomolecules remaining in the interior of the film, the antiblocking properties improve.

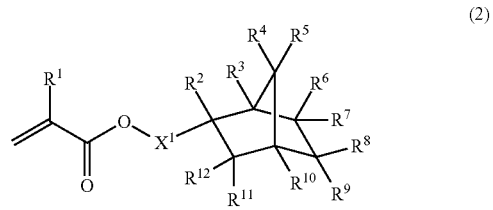
(2)

(In Formula (2), $R^1$ denotes a hydrogen atom or a methyl group, $X^1$ denotes a single bond or a divalent linking group, and $R^2$ to $R^{12}$ independently denote a hydrogen atom or an alkyl group.)

The compound represented by Formula (2) may be an acrylate compound or a methacrylate compound, but is preferably an acrylate compound, that is, $R^1$ is a hydrogen atom.

The divalent linking group denoted by $X^1$ in Formula (2) is not particularly limited as long as the effects of the present Invention are not greatly impaired; it is preferably a divalent hydrocarbon group or a divalent group in which a hydrocarbon group and an ether bond are combined, and is more preferably a divalent hydrocarbon group, a poly(alkyleneoxy) group, or a poly(alkyleneoxy)alkyl group. Furthermore, the number of carbons of the divalent linking group is preferably 1 to 60, and more preferably 1 to 40.

$X^1$ in Formula (2) is preferably a single bond, a divalent hydrocarbon group, or a divalent group in which a hydrocarbon group and an ether bond are combined, more preferably a single bond or a divalent hydrocarbon group, and particularly preferably a single bond.

The alkyl group denoted by $R^2$ to $R^{12}$ in Formula (2) is preferably an alkyl group having 1 to 8 carbons, more preferably an alkyl group having 1 to 4 carbons, and particularly preferably a methyl group. Furthermore, the alkyl group denoted by $R^2$ to $R^{12}$ may have a straight chain, branched, or ring structure.

It is preferable that $R^2$ to $R^{12}$ in Formula (2) are independently a hydrogen atom or an alkyl group having 1 to 8 carbons, more preferably a hydrogen atom or an alkyl group having 1 to 4 carbons, and yet more preferably a hydrogen atom or a methyl group.

Furthermore, it is particularly preferable that $R^2$ to $R^{12}$ in Formula (2) are all hydrogen atoms or $R^3$ to $R^5$ are methyl groups and $R^2$ and $R^6$ to $R^{12}$ are hydrogen atoms, and it is most preferable that $R^3$ to $R^5$ are methyl groups and $R^2$ and $R^6$ to $R^{12}$ are hydrogen atoms.

Specific examples of compounds represented by Formula (2) include, but of course are not limited to, compounds (B-1) to (B-6) shown below.

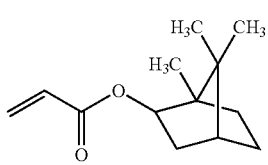

(B-1)

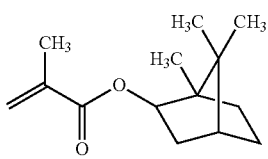

(B-2)

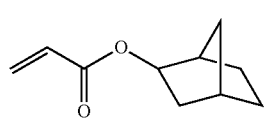

(B-3)

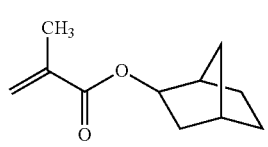

(B-4)

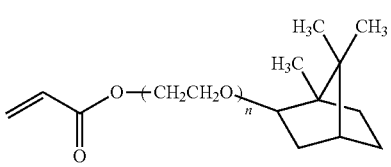

(B-5)

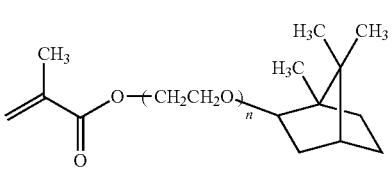

(B-6)

n = 1~30

Among them, isobornyl acrylate (B-1), isobornyl methacrylate (B-2), norbornyl acrylate (B-3), and norbornyl methacrylate (B-4) are preferable, isobornyl acrylate (B-1) and isobornyl methacrylate (B-2) are more preferable, and isobornyl acrylate (B-1) is particularly preferable.

From the viewpoint of giving a cured film having excellent adhesion to a substrate and giving an image having excellent surface gloss and flexibility and little stripe unevenness, the content of the compound represented by Formula (2) in the ink composition of the present invention is preferably 13 to 55 wt % relative to the total weight of the ink composition, more preferably 15 to 50 wt %, yet more preferably 20 to 45 wt %, particularly preferably 25 to 42 wt %, and most preferably 32 to 40 wt %.

From the viewpoint of giving an image having excellent surface gloss, little stripe unevenness, and excellent antiblocking properties, the content of the compound represented by Formula (2) in the ink composition of the present invention is preferably 1 to 13 wt % relative to the total weight of the ink, more preferably 1.5 to 13 wt %, yet more preferably 1.5 to 10 wt %, and particularly preferably 1.5 to 8 wt %.

When the total content of the compound represented by Formula (1) and the compound represented by Formula (2) is preferably 37 to 70 wt % relative to the total weight of the ink composition, more preferably 39 to 60 wt %, particularly preferably 40 to 59 wt %. When in the above-mentioned range, a printed material having excellent surface gloss and little stripe unevenness is obtained.

Furthermore, when the total content of Component 1-A, Component 1-B, and Component 1-D is preferably 40 to 90 wt % relative to the total weight of the ink composition, more preferably 45 to 85 wt %, particularly preferably 50 to 77 wt %. When in the above-mentioned range, an image having excellent surface gloss, little stripe unevenness, and excellent antiblocking properties is obtained.

(Component 1-E) (Meth)Acrylate Compound Containing Chain-Form Hydrocarbon Group Having 8 to 13 Carbons From the viewpoint of improving the surface gloss of a printed material, the ink composition of the present invention forming the ink set of the present invention preferably comprise (Component 1-E) a (meth)acrylate compound containing a chain-form hydrocarbon group having 8 to 13 carbons.

The chain-form hydrocarbon group in Component D may be a straight chain hydrocarbon group or a branched chain hydrocarbon group.

Component 1-E is preferably a (meth)acrylic acid ester of a chain-form hydrocarbon monoalcohol having 8 to 13 carbons, and more preferably a (meth)acrylic acid ester of a chain-form hydrocarbon monoalcohol having 10 to 13 carbons.

In the present specification, when both or either of 'acrylate' and 'methacrylate' are referred to, it might be expressed as '(meth)acrylate', and when both or either of 'acrylic' and 'methacrylic' are referred to, it might be expressed as '(meth)acrylic'.

Component 1-E may be either an acrylate compound or a methacrylate compound, and is preferably an acrylate compound.

Specific examples of Component 1-E include octyl (meth) acrylate, isooctyl (meth)acrylate, nonyl (meth)acrylate, decyl (meth)acrylate, isodecyl (meth)acrylate, lauryl (meth)acrylate, and tridecyl (meth)acrylate. Among them, isooctyl (meth)acrylate, decyl (meth)acrylate, isodecyl (meth)acrylate, lauryl (meth)acrylate, and tridecyl (meth)acrylate are preferable, isooctyl (meth)acrylate, isodecyl (meth)acrylate, and tridecyl (meth)acrylate are more preferable, and isodecyl (meth)acrylate is particularly preferable.

The content of Component 1-E in the ink composition of the present invention is preferably 3 to 25 wt % relative to the total weight of the ink composition, more preferably 5 to 20 wt %, yet more preferably 8 to 18 wt %, and particularly preferably 10 to 16 wt %. When in the above-mentioned range, an ink composition that gives a cured film with little tackiness and a printed material having excellent surface gloss can be obtained.

(Component 1-F) Oligomer

The ink composition of the present invention preferably comprises (Component 1-F) an oligomer.

An oligomer is generally a polymer in which a limited number (usually 5 to 100) of monomers are bonded, and known compounds called oligomers may be selected freely, but in the present invention it is preferable to select a polymer having a weight-average molecular weight of 400 to 10,000 (more preferably 500 to 5,000).

The oligomer may have a radically polymerizable group. The radically polymerizable group is preferably an ethylenically unsaturated group, and more preferably a (meth)acryloxy group.

The oligomer in the present invention may be any oligomer, and examples thereof include an olefin-based oligomer (an ethylene oligomer, a propylene oligomer, a butene oligomer, etc.), a vinyl-based oligomer (a styrene oligomer, a vinyl alcohol oligomer, a vinylpyrrolidone oligomer, an acrylate oligomer, a methacrylate oligomer, etc.), a diene-based oligomer (a butadiene oligomer, a chloroprene rubber, a pentadiene oligomer, etc.), a ring-opening polymerization type oligomer (di-, tri-, tetra-ethylene glycol, polyethylene glycol, polyethylimine, etc.), an addition-polymerization type oligomer (an oligoester acrylate, a polyamide oligomer, a polyisocyanate oligomer), and an addition-condensation oligomer (a phenolic resin, an amino resin, a xylene resin, a ketone resin, etc.). Among them an oligoester (meth)acrylate is preferable, and among them a urethane (meth)acrylate, a polyester (meth)acrylate, and an epoxy (meth)acrylate are preferable, and a urethane (meth)acrylate is more preferable.

As the urethane (meth)acrylate, an aliphatic urethane (meth)acrylate and an aromatic urethane (meth)acrylate may preferably be cited, and an aliphatic urethane (meth)acrylate may more preferably be cited.

Furthermore, the urethane (meth)acrylate is preferably a tetra- or lower-functional urethane (meth)acrylate, and more preferably a di- or lower-functional urethane (meth)acrylate.

In accordance with a urethane (meth)acrylate being contained, an ink composition having excellent adhesion to a substrate and excellent curability is obtained.

With respect to the oligomer, 'Origomar Handobukku (Oligomer Handbook)' (edited by Junji Furukawa, The Chemical Daily Co., Ltd.) may also be referred to.

As oligomer commercial products, examples of urethane (meth)acrylates include R1204, R1211, R1213, R1217, R1218, R1301, R1302, R1303, R1304, R1306, R1308, R1901, and R1150 manufactured by Dai-Ichi Kogyo Seiyaku Co., Ltd., the EBECRYL series (e.g. EBECRYL 230, 270, 4858, 8402, 8804, 8807, 8803, 9260, 1290, 1290K, 5129, 4842, 8210, 210, 4827, 6700, 4450, and 220) manufactured by Daicel-Cytec Company Ltd., NK Oligo U-4HA, U-6HA, U-15HA, U-108A, and U200AX manufactured by Shin-Nakamura Chemical Co., Ltd., and Aronix M-1100, M-1200, M-1210, M-1310, M-1600, and M-1960 manufactured by Toagosei Co., Ltd.

Examples of polyester (meth)acrylates include the EBECRYL series (e.g. EBECRY L770, IRR467, 81, 84, 83, 80, 675, 800, 810, 812, 1657, 1810, IRR302, 450, 670, 830, 870, 1830, 1870, 2870, IRR267, 813, IRR483, 811, etc.) manufactured by Daicel-Cytec Company Ltd. and Aronix M-6100, M-6200, M-6250, M-6500, M-7100, M-8030, M-8060, M-8100, M-8530, M-8560, and M-9050 manufactured by Toagosei Co., Ltd.

Examples of epoxy (meth)acrylates include the EBECRYL series (e.g. EBECRYL 600, 860, 2958, 3411, 3600, 3605, 3700, 3701, 3703, 3702, 3708, RDX63182, 6040, etc.) manufactured by Daicel-Cytec Company Ltd.

With regard to the oligomer, one type thereof may be used on its own or two or more types may be used in combination.

The content of the oligomer in the ink composition of the present invention is, relative to the total weight of the ink composition, preferably 0.1 to 50 wt %, more preferably 0.5 to 20 wt %, and yet more preferably 1 to 10 wt %.

When the content of the compound represented by Formula (2) is at least 1 wt % but less than 13 wt % relative to the entire weight of the ink composition, the ink composition of the present invention preferably either does not comprise an oligomer having an ethylenically unsaturated group or comprises an oligomer having an ethylenically unsaturated group at a content of greater than 0 wt % but less than 4 wt % relative to the entire weight of the ink composition, more preferably either does not comprise it or comprises it at greater than 0 wt % but less than 3.5 wt %, yet more preferably either does not comprise it or comprises it at greater than 0 wt % but less than 3.0 wt %, and particularly preferably does not comprise it. When in the above-mentioned range, a viscosity of the ink composition, which is suitable for promoting to spread while wet of a fired and landed droplet on a support, is maintained, and a printed material having excellent surface gloss is obtained.

(Component 1-G) Surfactant

The ink composition of the present invention may comprise a surfactant in order to impart discharge properties that are stable for a long period of time.

From the viewpoint of surface gloss and suppressing stripe unevenness, the ink composition of the present invention either does not comprise a silicone-based surfactant or a fluorine-based surfactant or comprises a silicone-based surfactant and a fluorine-based surfactant at a total content of greater than 0 wt % but no greater than 0.03 wt % relative to the entire weight of the ink composition, preferably either does not comprise them or comprises them at greater than 0 wt % but no greater than 0.005 wt %, and particularly preferably does not comprise them.

It is surmised that when drawing is carried out, particularly in multipass mode, a surfactant, in particular, a silicone-based surfactant or a fluorine-based surfactant, that reduces the surface energy of a cured film greatly increases the contact angle of a fired droplet that is superimposed on a liquid droplet that has been fired first and cured or semicured, thus degrading the gloss of an image.

Examples of a surfactant other than the silicone-based surfactant and fluorine-based surfactant include those described in JP-A-62-173463 and JP-A-62-183457. Examples include an anionic surfactant such as a dialkylsulfosuccinate, an alkylnaphthalenesulfonate, or a fatty acid salt, a nonionic surfactant such as a polyoxyethylene alkyl ether, a polyoxyethylene alkyl allyl ether, an acetylene glycol, or a polyoxyethylene/polyoxypropylene block copolymer, and a cationic surfactant such as an alkylamine salt or a quaternary ammonium salt.

(Component 1-H) Di- or Higher-Functional (Meth)Acrylate Compound

The ink composition of the present invention preferably comprises a di- or higher-functional (meth)acrylate compound. In particular, when the content of the compound represented by Formula (2) in the ink composition of the present invention is at least 1 wt % but less than 13 wt % relative to the entire weight of the composition, it is preferable for the composition to comprise a di- or higher-functional (meth)acrylate compound.

The di- or higher-functional (meth)acrylate compound is preferably a di- or higher-functional (meth)acrylate compound having a hydrocarbon chain having at least 5 carbons in the molecule or a di- or higher-functional (meth)acrylate compound having a propylene oxide chain or a tetraethylene glycol chain in the molecule, more preferably a difunctional (meth)acrylate compound having a hydrocarbon chain having at least 5 carbons in the molecule or a difunctional (meth)acrylate compound having a propylene oxide chain or a tetraethylene glycol chain in the molecule, and yet more preferably a difunctional (meth)acrylate compound having a hydrocarbon chain having at least 5 carbons in the molecule.

Specific preferred examples thereof include dipropylene glycol di(meth)acrylate, tripropylene glycol di(meth)acrylate, polytetraethylene glycol di(meth)acrylate, a propylene oxide (PO)-modified neopentyl glycol di(meth)acrylate, a PO-modified hexanediol di(meth)acrylate, neopentyl glycol di(meth)acrylate, pentanediol di(meth)acrylate, hexanediol di(meth)acrylate, 3-methylpentanediol di(meth)acrylate, heptanediol di(meth)acrylate, octanediol di(meth)acrylate, nonanediol di(meth)acrylate, and decanediol di(meth)acrylate.

Among them, a PO-modified neopentyl glycol di(meth) acrylate, hexanediol diacrylate, neopentyl glycol diacrylate, and 3-methyl-1,5-pentanediol diacrylate are more preferable, neopentyl glycol diacrylate and 3-methyl-1,5-pentanediol diacrylate are yet more preferable, and 3-methyl-1,5-pentanediol diacrylate is particularly preferable.

Furthermore, examples of the tri- or higher-functional (meth)acrylate compound include pentaerythritol tri(meth)acrylate, pentaerythritol tetra(meth)acrylate, dipentaerythritol tetra(meth)acrylate, trimethylolethane tri(meth)acrylate, trimethylolpropane tri(meth)acrylate, tetramethylolmethane tetra(meth)acrylate, and an oligoester (meth)acrylate.

The hydrocarbon chain having at least 5 carbons may be a straight-chain form or a branched form.

Furthermore, the hydrocarbon chain having at least 5 carbons is preferably a hydrocarbon chain having at least 5 but no greater than 12 carbons, more preferably a straight-chain or branched alkylene group having at least 5 but no greater than 12 carbons, and yet more preferably a straight-chain or branched alkylene group having at least 5 but no greater than 8 carbons.

The content of the di- or higher-functional (meth)acrylate compound in the ink composition of the present invention is preferably at least 3 wt % but no greater than 25 wt % relative to the entire weight of the ink composition, more preferably at least 4 wt % but no greater than 23 wt %, and yet more preferably at least 5 wt % but no greater than 20 wt %. When in the above-mentioned range, an image having excellent surface gloss, little stripe unevenness, and excellent antiblocking properties is obtained.

(Component 1-I) Other Polymerizable Compound

The ink composition of the present invention may comprise a polymerizable compound other than Component 1-A, Component 1-B, Component 1-D, Component 1-E, Component 1-F, and Component 1-G.

As the other polymerizable compound, an ethylenically unsaturated compound is preferable.

As the other polymerizable compound, a known polymerizable compound may be used, and examples thereof include a (meth)acrylate compound, a vinyl ether compound, an allyl compound, an N-vinyl compound, and an unsaturated carboxylic acid other than Component 1-A, Component 1-B, Component 1-D, Component 1-E, Component 1-F, and Component 1-G. Examples thereof include radically polymerizable monomers described in JP-A-2009-221414, polymerizable compounds described in JP-A-2009-209289, and ethylenically unsaturated compounds described in JP-A-2009-191183.

As the other polymerizable compound, a (meth)acrylate compound is preferable, and an acrylate compound is more preferable.

Specific preferred examples of the other polymerizable compound include phenoxyethyl (meth)acrylate.

Moreover, the ink composition of the present invention preferably comprise a polyfunctional polymerizable compound as the other polymerizable compound, and more preferably comprise a polyfunctional (meth)acrylate compound.

The content of the polyfunctional (meth)acrylate compound in the ink composition of the present invention is preferably 3 to 20 wt % relative to the entire weight of the ink composition, more preferably 4 to 18 wt %, and yet more preferably 5 to 16 wt %.

The polyfunctional (meth)acrylate compound is preferably the above-mentioned difunctional (meth)acrylate compound or trifunctional (meth)acrylate compound, more preferably the above-mentioned difunctional (meth)acrylate compound.

When the polyfunctional (meth)acrylate compound, in particular the above-mentioned compound, is used, an ink composition that can give a printed material having excellent surface gloss and excellent curability. Moreover, from the viewpoint of curability and antiblocking properties, the polyfunctional (meth)acrylate compound is more preferable.

Preferred examples of the other polymerizable compound include an aromatic group-containing monofunctional (meth)acrylate compound. The cyclic structure of the aromatic group-containing monofunctional (meth)acrylate compound may contain a hetero atom such as O, N, S, etc.

Preferred examples of an aromatic ring structure that the aromatic group-containing monofunctional (meth)acrylate compound may have include a ring structure selected from the group consisting of benzene, naphthalene, anthracene, indene, fluorene, 1H-phenalene, phenanthrene, triphenylene, pyrene, naphthacene, tetraphene, biphenyl, as-indacene, s-indacene, acenaphthylene, fluoranthene, acephenanthrylene, aceanthrylene, chrysene, pleiadene, furan, thiophene, pyrroline, pyrazoline, imidazoline, isooxazoline, isothiazoline, pyridine, pyridazine, pyrimidine, pyrazine, triazole, and tetrazole.

Among them, the specific examples of the aromatic group-containing monofunctional (meth)acrylate compound particularly preferably include phenoxyethyl (meth)acrylate.

Examples of the other polymerizable compound include unsaturated carboxylic acids such as acrylic acid, methacrylic acid, itaconic acid, crotonic acid, isocrotonic acid, and maleic acid, and salts thereof, an ethylenically unsaturated group-containing anhydride, acrylonitrile, styrene and, furthermore, radically polymerizable compounds such as various types of unsaturated polyesters, unsaturated polyethers, unsaturated polyamides, and unsaturated urethane.

Examples of other polymerizable compound include (meth)acrylic acid derivatives such as 2-ethylhexyl(meth)acrylate, 2-hydroxyethyl(meth)acrylate, butoxyethyl(meth)acrylate, carbitol (meth)acrylate, cyclohexyl (meth)acrylate, tetrahydrofurfuryl (meth)acrylate, benzyl (meth)acrylate, methyl (meth)acrylate, n-butyl (meth)acrylate, allyl (meth)acrylate, glycidyl (meth)acrylate, dimethylaminomethyl (meth)acrylate, bis(4-(meth)acryloxypolyethoxyphenyl)propane, neopentyl glycol di(meth)acrylate, PO-modified neopentyl glycol di(meth)acrylate, 1,6-hexanediol di(meth)acrylate, ethylene glycol di(meth)acrylate, diethylene glycol di(meth)acrylate, triethylene glycol di(meth)acrylate, tetraethylene glycol di(meth)acrylate, polyethylene glycol di(meth)acrylate, polypropylene glycol di(meth)acrylate, pentaerythritol tri(meth)acrylate, pentaerythritol tetra(meth)acrylate, dipentaerythritol tetra(meth)acrylate, trimethylolethane tri(meth)acrylate, trimethylolpropane tri(meth)acrylate, tetramethylolmethane tetra(meth)acrylate, oligoester (meth)acrylate, 2,2-bis(4-(meth)acryloxypolyethoxyphenyl) propane, N-methylol (meth)acrylamide, diacetone (meth)acrylamide, and epoxy (meth)acrylate, allyl compound derivatives such as allyl glycidyl ether, diallyl phthalate, triallyl trimellitate, etc.

More specifically, commercially available or industrially known radically polymerizable or crosslinking monomers, oligomers, and polymers, such as those described in 'Kakyozai Handobukku' (Crosslinking Agent Handbook), Ed. S. Yamashita (Taiseisha, 1981); 'UV/EB Koka Handobukku (Genryo)' (UV/EB Curing Handbook (Starting Materials)) Ed. K. Kato (Kobunshi Kankoukai, 1985); 'UV/EB Koka Gijutsu no Oyo to Shijyo' (Application and Market of UV/EB Curing Technology), p. 79, Ed. RadTech (CMC, 1989); and E. Takiyama 'Poriesuteru Jushi Handobukku' (Polyester Resin Handbook), (The Nikkan Kogyo Shimbun Ltd., 1988) may be used.

The molecular weight of the other polymerizable monomer is preferably 80 to 2,000 and more preferably 80 to 1,000, and yet more preferably 80 to 800.

Furthermore, as the other polymerizable compound, it is preferable to use a vinyl ether compound. The vinyl ether compound can be roughly divided into monovinyl ether compound and di- or tri-vinyl ether compound.

Examples of vinyl ether compounds that are suitably used include di- or tri-vinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexanedimethanol divinyl ether, and trimethylolpropane trivinyl ether, and monovinyl ether compounds such as ethylene glycol monovinyl ether, triethylene glycol monovinyl ether, hydroxyethyl monovinyl ether, ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, hydroxynonyl monovinyl ether, cyclohexanedimethanol monovinyl ether, n-propyl vinyl ether, isopropyl vinyl ether, isopropenyl vinyl ether, dodecyl vinyl ether, and diethylene glycol monovinyl ether.

When the ink composition of the present invention comprise another polymerizable compound, the content of the other polymerizable compound in the ink composition of the present invention is preferably 1 to 40 wt % relative to the total weight of the ink composition, more preferably 3 to 30 wt %, and particularly preferably 5 to 25 wt %.

Furthermore, when the ink composition of the present invention comprise a polyfunctional polymerizable compound and the content of the compound represented by Formula (2) is 13 to 55 wt %, the content of the polyfunctional polymerizable compound is preferably 1 to 20 wt % relative to the total weight of the ink composition, more preferably 2 to 10 wt %, and particularly preferably 3 to 7 wt %.

(Component 1-J) Other Polymerization Initiator

The ink composition of the present invention may comprise a polymerization initiator other than Component 1-C.

A polymerization initiator is a compound that absorbs external energy such as the above-mentioned actinic radiation to thus form a polymerization-initiating species. With regard to the polymerization initiator, one type thereof may be used on its own or two or more types thereof may be used in combination.

Preferred examples of the other polymerization initiator that can be used in the present invention include a radical polymerization initiator, and more preferred examples thereof include an α-hydroxy ketone compound, a monoacylphosphine compound, an aromatic onium salt compound, an organic peroxide, a thio compound, a hexaarylbiimidazole compound, a ketoxime ester compound, a borate compound, an azinium compound, a metallocene compound, an active ester compound, and a compound having a carbon-halogen bond. Specific examples of the polymerization initiator include radical polymerization initiators described in JP-A-2008-208190. Among them, as the other polymerization initiator an α-hydroxy ketone compound and an acylphosphine compound can preferably be cited.

Furthermore, the ink composition of the present invention may employ a known sensitizer other than a thioxanthone compound or a thiochromanone compound as the other polymerization initiator, but preferably does not contain one. Examples of the sensitizer include those described in JP-A-2008-208190.

Examples of the α-hydroxy ketone compound include 1-[4-(2-hydroxyethoxy)phenyl]-2-hydroxy-2-methyl-1-propan-1-one, 2-hydroxy-2-methyl-1-phenylpropan-1-one, and 1-hydroxycyclohexyl phenyl ketone; among them, a 1-hydroxycyclohexyl phenyl ketone compound is preferable. In the present invention, the 1-hydroxycyclohexyl phenyl ketone compound includes a compound in which 1-hydroxycyclohexyl phenyl ketone is substituted with any substituent. The substituent may be selected freely as long as capability as a radical polymerization initiator is exhibited, and specific examples include an alkyl group having 1 to 4 carbon atoms.

Examples of the monoacylphosphine oxide compound include methyl isobutyrylmethylphosphinate, methyl isobutyrylphenylphosphinate, methyl pivaloylphenylphosphinate, methyl 2-ethylhexanoylphenylphosphinate, isopropyl pivaloylphenylphosphinate, methyl p-toluoylphenylphosphinate, methyl o-toluoylphenylphosphinate, methyl 2,4-dimethylbenzoylphenylphosphinate, isopropyl p-t-butylbenzoylphenylphosphinate, methyl acryloylphenylphosphinate, isobutyryldiphenylphosphine oxide, 2-ethylhexanoyldiphenylphosphine oxide, o-toluoyldiphenylphosphine oxide, p-t-butylbenzoyldiphenylphosphine oxide, 3-pyridylcarbonyldiphenylphosphine oxide, acryloyldiphenylphosphine oxide, benzoyldiphenylphosphine oxide, vinyl pivaloylphenylphosphinate, adipoylbisdiphenylphosphine oxide, pivaloyldiphenylphosphine oxide, p-toluoyldiphenylphosphine oxide, 4-(t-butyl)benzoyldiphenylphosphine oxide, terephthaloylbisdiphenylphosphine oxide, 2-methylbenzoyldiphenylphosphine oxide, versatoyldiphenylphosphine oxide, 2-methyl-2-ethylhexanoyldiphenylphosphine oxide, 1-methylcyclohexanoyldiphenylphosphine oxide, methyl pivaloylphenylphosphinate, isopropyl pivaloylphenylphosphinate, and 2,4,6-trimethylbenzoyldiphenylphosphine oxide. Among them, 2,4,6-trimethylbenzoyldiphenylphosphine oxide is preferable.

In the present invention, when a polymerization initiator other than Component 1-C is used, the amount thereof used relative to the total content of the polymerizable compounds is preferably 0.01 to 20 wt %, and more preferably 0.5 to 15 wt %.

(Component 1-K) Colorant

In the present invention, the ink composition may preferably contain a colorant in order to improve the visibility of a formed image area.

The colorant is not particularly limited, but a pigment and an oil-soluble dye that have excellent weather resistance and rich color reproduction are preferable, and it may be selected from any known coloring agent such as a soluble dye. It is preferable that the colorant does not function as a polymerization inhibitor in a polymerization reaction, which is a curing reaction. This is because the sensitivity of the curing reaction by actinic radiation should not be degraded.

The pigment that can be used in the present invention is not particularly limited and, for example, organic and inorganic pigments having the numbers below described in the Color Index may be used.

That is, as a red or magenta pigment, Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, or 257, Pigment Violet 3, 19, 23, 29, 30, 37, 50, or 88, and Pigment Orange 13, 16, 20, or 36;

as a blue or cyan pigment, Pigment Blue 1, 15, 15:1, 15:2, 15:3, 15:4, 15:6, 16, 17-1, 22, 27, 28, 29, 36, or 60;

as a green pigment, Pigment Green 7, 26, 36, or 50;

as a yellow pigment, Pigment Yellow 1, 3, 12, 13, 14, 17, 34, 35, 37, 55, 74, 81, 83, 93, 94, 95, 97, 108, 109, 110, 120, 137, 138, 139, 153, 154, 155, 157, 166, 167, 168, 180, 185, or 193;

as a black pigment, Pigment Black 7, 28, or 26;

as a white pigment, Pigment White 6, 18, or 21, etc. may be used according to the intended application.

In the present invention, a disperse dye may be used in a range that enables it to be dissolved in a water-immiscible organic solvent. Disperse dyes generally include water-soluble dyes, but in the present invention it is preferable for the disperse dye to be used in a range such that it dissolves in a water-immiscible organic solvent.

Specific preferred examples of the disperse dye include CI Disperse Yellow 5, 42, 54, 64, 79, 82, 83, 93, 99, 100, 119, 122, 124, 126, 160, 184:1, 186, 198, 199, 201, 204, 224, and 237; CI Disperse Orange 13, 29, 31:1, 33, 49, 54, 55, 66, 73, 118, 119, and 163; CI Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356, and 362; CI Disperse Violet 33; CI Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365, and 368; and CI Disperse Green 6:1 and 9.

It is preferable that the colorant is added to the ink composition and then dispersed in the ink to an appropriate degree. For dispersion of the colorant, for example, a dispersing machine such as a ball mill, a sand mill, an attritor, a roll mill, an agitator, a Henschel mixer, a colloidal mill, an ultrasonic homogenizer, a pearl mill, a wet type jet mill, or a paint shaker may be used.

The colorant may be added directly to the ink composition, but in order to improve dispersibility it may be added in advance to a solvent or a dispersing medium such as a polymerizable compound used in the present invention.

In the present invention, in order to avoid the problem of the solvent resistance being degraded when the solvent remains in the cured image and the VOC (Volatile Organic Compound) problem of the residual solvent, it is preferable to add the colorant in advance to a dispersing medium such as a polymerizable compound. As a polymerizable compound used, it is preferable in terms of dispersion suitability to select a monomer having the lowest viscosity.

The colorants may be used by appropriately selecting one type or two or more types according to the intended purpose of the ink composition.

When a colorant such as a pigment that is present as a solid in the ink composition is used, it is preferable for the colorant, the dispersant, the dispersing medium, dispersion conditions, and filtration conditions to be set so that the average particle size of colorant particles is preferably 0.005 to 0.5 µm, more preferably 0.01 to 0.45 µm, and yet more preferably 0.015 to 0.4 µm. By such control of particle size, clogging of a head nozzle can be suppressed, and the ink storage stability, the transparency, and the curing sensitivity can be maintained.

The content of the colorant in the ink composition is appropriately selected according to the color and the intended purpose, and is preferably 0.01 to 30 wt % relative to the weight of the entire ink composition.

(Component 1-L) Dispersant

The ink composition of the present invention preferably comprises a dispersant. In particular, when the pigment is used, the ink composition preferably comprises a dispersant in order to stably disperse the pigment in the ink composition.

As the dispersant that can be used in the present invention, a polymeric dispersant is preferable. The 'polymeric dispersant' referred to in the present invention means a dispersant having a weight-average molecular weight of 1,000 or greater.

Examples of the polymeric dispersant include polymeric dispersants such as DISPERBYK-101, DISPERBYK-102, DISPERBYK-103, DISPERBYK-106, DISPERBYK-111, DISPERBYK-161, DISPERBYK-162, DISPERBYK-163, DISPERBYK-164, DISPERBYK-166, DISPERBYK-167, DISPERBYK-168, DISPERBYK-170, DISPERBYK-171, DISPERBYK-174, and DISPERBYK-182 (manufactured by BYK Chemie), EFKA4010, EFKA4046, EFKA4080, EFKA5010, EFKA5207, EFKA5244, EFKA6745, EFKA6750, EFKA7414, EFKA745, EFKA7462, EFKA7500, EFKA7570, EFKA7575, and EFKA7580 (manufactured by EFKA Additives), Disperse Aid 6, Disperse Aid 8, Disperse Aid 15, and Disperse Aid 9100 (manufactured by San Nopco Limited); various types of SOLSPERSE dispersants such as Solsperse 3000, 5000, 9000, 12000, 13240, 13940, 17000, 22000, 24000, 26000, 28000, 32000, 36000, 39000, 41000, and 71000 (manufactured by Noveon); Adeka Pluronic L31, F38, L42, L44, L61, L64, F68, L72, P95, F77, P84, F87, P94, L101, P103, F108, L121, and P-123 (manufactured by Adeka Corporation), Ionet S-20 (manufactured by Sanyo Chemical Industries, Ltd.), and Disparlon KS-860, 873SN, and 874 (polymeric dispersant), #2150 (aliphatic poly carboxylic acid), and #7004 (polyether ester type) (manufactured by Kusumoto Chemicals, Ltd.).

The content of the dispersant in the ink composition of the present invention is appropriately selected according to the intended purpose, and is generally preferably 0.05 to 15 wt % relative to the weight of the entire ink composition.

Other Components

The ink composition of the present invention may comprise as necessary, in addition to the above-mentioned components, a co-sensitizer, a UV absorber, an antioxidant, an antifading agent, a conductive salt, a solvent, a polymer compound, a basic compound, etc. They are described in JP-A-2009-221416 and may be used in the present invention as well.

Furthermore, from the viewpoint of storage properties and suppression of head clogging, the ink composition of the present invention preferably comprises a polymerization inhibitor.

The polymerization inhibitor is preferably added at 200 to 20,000 ppm relative to the total amount of the ink composition of the present invention.

Examples of the polymerization inhibitor include a nitroso-based polymerization inhibitor, a hindered amine-based polymerization inhibitor, hydroquinone, benzoquinone, p-methoxyphenol, TEMPO, TEMPOL, and Al cupferron.

Properties of Ink Composition

In the present invention, the ink composition has a viscosity at 25° C. of preferably no more than 40 mPa·s, more preferably 5 to 40 mPa·s, and yet more preferably 7 to 30 mPa·s. Furthermore, the viscosity of the ink composition at the discharge temperature (preferably 25° C. to 80° C., and more preferably 25° C. to 50° C.) is preferably 3 to 15 mPa·s, and more preferably 3 to 13 mPa·s. With regard to the ink composition of the present invention, it is preferable that its component ratio is appropriately adjusted so that the viscosity is in the above-mentioned range. When the viscosity at room temperature (25° C.) is set to be high, even when a porous recording medium (support) is used, penetration of the ink composition into the recording medium can be prevented, and uncured monomer can be reduced. Furthermore, ink spreading when droplets of ink composition have landed can be suppressed, and as a result there is the advantage that the image quality is improved.

The surface tension at 25° C. of the ink composition of the present invention is preferably at least 28 mN/m but no greater than 37.5 mN/m, more preferably at least 31 mN/m but no greater than 37.5 mN/m, yet more preferably at least 32 mN/m but no greater than 37.0 mN/m, particularly preferably at least 32.5 mN/m but no greater than 36.8 mN/m, and most preferably at least 33.0 mN/m but no greater than 36.5 mN/m. When in the above-mentioned range, a printed material having excellent surface gloss is obtained.

As a method for measuring the surface tension at 25° C. of the ink composition, a known method may be used, but it is preferable to carry out measurement by a suspended ring method or the Wilhelmy method. Preferred examples include a method in which measurement is carried out using a CBVP-Z automated surface tensiometer manufactured by Kyowa Interface Science Co., Ltd. and a method in which measurement is carried out using a SIGMA 702 manufactured by KSV Instruments Ltd.

The ink composition in the second embodiment of the present invention is now explained in detail.

The inkjet ink composition in the second embodiment of the present invention comprises (Component 2-A) the di(meth)acrylate of a hydrocarbon diol having 5 to 10 carbons at 3 to 35 wt %, (Component 2-B) a compound represented by Formula (1) at 35 to 70 wt %, and (Component 2-C) a polymerization initiator, the composition having a total content of Component 2-A and Component 2-B of 50 to 90 wt % and a surface tension at 25° C. of 33 to 37.5 mN/m.

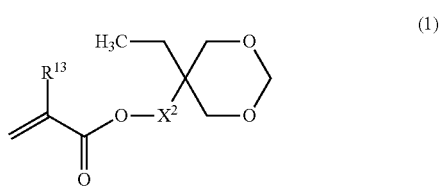

(In Formula (1), $R^{13}$ denotes a hydrogen atom or a methyl group, and $X^2$ denotes a single bond or a divalent linking group.)

Surface Tension of Ink Composition

The surface tension at 25° C. of the ink composition of the present invention is 33 to 37.5 mN/m, preferably 33.5 to 37.0 mN/m, and more preferably 33.5 to 36.5 mN/m. When in the above-mentioned range, an image having excellent surface gloss is obtained. It is surmised that when the surface tension at 25° C. is no greater than 37.5 mN/m, spreading while wet on a support is promoted, and when it is at least 33 mN/m, spreading while wet of a fired droplet overprinted on a previously fired liquid droplet when printing in a multipass mode in particular is promoted.

As a method for measuring the surface tension of the ink composition, a method in which measurement is carried out by the Wilhelmy method at a liquid temperature of 25° C. using a standard surface tensiometer (e.g. a CBVP-Z surface tensiometer manufactured by Kyowa Interface Science Co., Ltd.) can be cited as an example.

In order that the ink composition of the present invention has a surface tension at 25° C. in the range of 33 to 36.5 mN/m, it is preferable that the ink composition of the present invention either does not comprise a silicone-based surfactant or a fluorine-based surfactant or comprises a silicone-based surfactant and a fluorine-based surfactant at a total content of less than 0.01 wt % relative to the entire weight of the ink composition, it is more preferable that it either does not comprise a silicone-based surfactant or a fluorine-based surfactant or comprises them at no greater than 0.005 wt %, and it is particularly preferable that it does not comprise a silicone-based surfactant or a fluorine-based surfactant. When in the above-mentioned range, an image having excellent surface gloss is obtained. It is surmised that spreading while wet of a fired droplet overprinted on a previously fired liquid droplet when printing in a multipass mode in particular is promoted.

Furthermore, the ink composition of the present invention preferably either does not comprise a silicone chain-containing compound or a perfluoroalkyl chain-containing compound or comprises a silicone chain-containing compound and a perfluoroalkyl chain-containing compound at a total content of less than 0.01 wt % relative to the entire weight of the ink composition, more preferably either does not comprise a silicone chain-containing compound or a perfluoroalkyl chain-containing compound or comprises them at no greater than 0.005 wt %, and particularly preferably does not comprise a silicone chain-containing compound or a perfluoroalkyl chain-containing compound. When in the above-mentioned range, an image having excellent surface gloss is obtained.

The silicone chain means two or more siloxane bonds being connected, and the perfluoroalkyl chain means a perfluoroalkyl group having at least 2 carbons.

(Component 2-A) Di(Meth)Acrylate of Hydrocarbon Diol Having 5 to 10 Carbons

The ink composition of the present invention comprises (Component 2-A) the di(meth)acrylate of a hydrocarbon diol having 5 to 10 carbons, and the content of Component 2-A is 3 to 35 wt % relative to the entire weight of the ink composition.

The hydrocarbon diol having 5 to 10 carbons in Component 2-A may be a straight-chain hydrocarbon diol, a hydrocarbon diol having a branched structure, or a hydrocarbon diol having a ring structure, is preferably a straight-chain hydrocarbon diol or a hydrocarbon diol having a branched structure, and is more preferably a hydrocarbon diol having a branched structure.

Furthermore, the number of carbons of the hydrocarbon diol in Component 2-A is 5 to 10, preferably 5 to 9, more preferably 5 or 6, and particularly preferably 6.

Moreover, as (Component 2-A, the di(meth)acrylate of a hydrocarbon diol having 5 to 9 carbons is preferable, the di(meth)acrylate of a hydrocarbon diol having 5 or 6 carbons is more preferable, the di(meth)acrylate of a hydrocarbon diol having 5 or 6 carbons and a branched structure is yet more preferable, and the di(meth)acrylate of a hydrocarbon diol having 6 carbons and a branched structure is particularly preferable.

In the present invention, '(meth)acrylate' is sometimes used to indicate either of, or both, 'acrylate' and 'methacrylate', and '(meth)acrylic' is sometimes used to indicate either of, or both, 'acrylic' and 'methacrylic'.

Component 2-A may be an acrylate compound or a methacrylate compound, but is preferably an acrylate compound.

Specific preferred examples of Component 2-A include neopentyl glycol di(meth)acrylate, pentanediol di(meth)acrylate, hexanediol di(meth)acrylate, 3-methylpentanediol di(meth)acrylate, heptanediol di(meth)acrylate, octanediol di(meth)acrylate, nonanediol di(meth)acrylate, and decanediol di(meth)acrylate.

Among them, hexanediol di(meth)acrylate, neopentyl glycol di(meth)acrylate, and 3-methyl-1,5-pentanediol di(meth)acrylate are more preferable, neopentyl glycol di(meth)acrylate and 3-methyl-1,5-pentanediol di(meth)acrylate are yet more preferable, and 3-methyl-1,5-pentanediol di(meth)acrylate is particularly preferable.

The content of Component 2-A in the ink composition of the present invention is preferably 3 to 30 wt % relative to the entire weight of the ink composition, more preferably 5 to 25 wt %, and particularly preferably 7 to 20 wt %. When in the above-mentioned range, a curing profile is promoted in which, while strongly promoting the curability of the interior of a printed material, the outermost surface alone of a cured film is selectively maintained in a liquid state for a long period of time, and a printed material having high surface gloss and inconspicuous stripe unevenness is obtained.

(Component 2-B) Compound Represented by Formula (1)

The ink composition of the present invention comprises (Component 2-B) the compound represented by Formula (1), and the content of Component B is 35 to 70 wt % relative to the entire weight of the ink composition. Due to the ink composition of the present invention comprising Component 2-B, an image having excellent surface gloss and little stripe unevenness is obtained.

Specific preferred examples of (Component 2-B) the compound represented by Formula (1) are the same as the specific preferred examples of (Component 1-B) the compound represented by Formula (1).

With regard to Component 2-B, one type thereof may be used on its own or two or more types thereof may be used in combination.

The content of the compound represented by Formula (1) in the ink composition of the present invention is preferably 40 to 60 wt % relative to the entire weight of the ink composition, and particularly preferably 40 to 55 wt %. When in the above-mentioned range, an image having excellent surface gloss and little stripe unevenness is obtained. Furthermore, the viscosity of the ink composition becomes appropriate, and an ink composition having excellent continuous discharge stability is obtained.

Furthermore, the total content of Component 2-A and Component 2-B in the ink composition of the present invention is 50 to 90 wt % relative to the entire weight of the ink composition, preferably 55 to 85 wt %, more preferably 58 to 85 wt %, and particularly preferably 60 to 85 wt %. When in the above-mentioned range, an image having excellent surface gloss and little stripe unevenness is obtained.

(Component 2-C) Polymerization Initiator

The ink composition of the present invention comprises (Component 2-C) a polymerization initiator.

The polymerization initiator is a compound that forms a polymerization initiating species by absorbing external energy such as above-mentioned actinic radiation. The polymerization initiator may be used singly or in a combination of two or more compounds.

Preferred examples of the polymerization initiator that can be used in the present invention include a radical polymerization initiator, and more preferred examples thereof include an α-hydroxy ketone compound, a monoacylphosphine compound, an aromatic onium salt compound, an organic peroxide, a thio compound, a hexaarylbiimidazole compound, a ketoxime ester compound, a borate compound, an azinium compound, a metallocene compound, an active ester compound, and a compound having a carbon-halogen bond. Specific examples of the polymerization initiator include radical polymerization initiators described in JP-A-2008-208190. Among them, an aromatic ketone and acylphosphine compound can preferably be cited, and an α-hydroxy ketone compound and an acylphosphine compound can more preferably be cited.

The aromatic ketone is preferably an α-hydroxyketone compound.

Examples thereof include 1-[4-(2-hydroxyethoxy)phenyl]-2-hydroxy-2-methyl-1-propan-1-one, 2-hydroxy-2-methyl-1-phenyl-propan-1-one, and 1-hydroxycyclohexyl phenyl ketone. Among them, 1-hydroxycyclohexyl phenyl ketone compound is preferable. The 1-hydroxycyclohexyl phenyl ketone compound referred to in the present invention comprises a compound obtained by substituting 1-hydroxycyclohexyl phenyl ketone with any substituent. The substituent may be selected freely from a range that enables an ability as a radical polymerization initiator to be exhibited, and specific examples thereof include an alkyl group having 1 to 4 carbons.

Preferred examples of the acylphosphine compound include acylphosphine oxide compounds described in JP-A-2008-208190, and among them a monoacylphosphine oxide compound is more preferable.

Specific examples of the monoacylphosphine compound include methyl isobutyrylmethylphosphinate, methyl isobutyrylphenylphosphinate, methyl pivaloylphenylphosphinate, methyl 2-ethylhexanoylphenylphosphinate, isopropyl pivaloylphenylphosphinate, methyl p-tolylphenylphosphinate, methyl o-tolylphenylphosphinate, methyl 2,4-dimethylbenzoylphenylphosphinate, isopropyl p-t-butylbenzoylphenylphosphinate, methyl acryloylphenylphosphinate, isobutyryldiphenylphosphine oxide, 2-ethylhexanoyldiphenylphosphine oxide, o-tolyldiphenylphosphine oxide, p-t-butylbenzoyldiphenylphosphine oxide, 3-pyridylcarbonyldiphenylphosphine oxide, acryloyldiphenylphosphine oxide, benzoyldiphenylphosphine oxide, vinyl pivaloylphenylphosphinate, adipoyl-bis-diphenylphosphine oxide, pivaloyldiphenylphosphine oxide, p-tolyldiphenylphosphine oxide, 4-(t-butyl)benzoyldiphenylphosphine oxide, terephthaloyl-bis-diphenylphosphine oxide, 2-methylbenzoyldiphenylphosphine oxide, versatoyldiphenylphosphine oxide, 2-methyl-2-ethylhexanoyldiphenylphosphine oxide, 1-methylcyclohexanoyldiphenylphosphine oxide, isopropyl pivaloylphenylphosphinate and 2,4,6-trimethylbenzoyldiphenylphosphine oxide, and among them, 2,4,6-trimethylbenzoyldiphenylphosphine oxide is preferable.

The ink composition of the present invention preferably comprises α-hydroxyketone compound and/or acylphosphine oxide compound and more preferably comprises α-hydroxyketone compound and acylphosphine oxide compound. Specifically, the ink composition preferably comprises α-hydroxyketone compound and/or monoacylphosphine oxide compound, and from the viewpoint of the curability and the anti-blocking properties, the combination of α-hydroxyketone compound and monoacylphosphine oxide compound is more preferable.

The ink composition of the present invention preferably contains a sensitizer in order to promote decomposition of the photopolymerization initiator by absorbing specific actinic radiation.

Examples of the sensitizer include polynuclear aromatic compounds (e.g. pyrene, perylene, triphenylene, 2-ethyl-9,10-dimethoxy anthracene), xanthenes (e.g. fluorescein, eosin, erythrosine, rhodamine B, rose bengal), cyanines (e.g. thiacarbocyanine, oxacarbocyanine), merocyanines (e.g. merocyanine, carbomerocyanine), thiazines (e.g. thionine, methylene blue, toluidine blue), acridines (e.g. acridine orange, chloroflavin, acriflavine), anthraquinones (e.g. anthraquinone), squaryliums (e.g. squarylium), coumarins (e.g. 7-diethylamino-4-methylcoumarin), and thioxanthones (e.g. thioxanthone, 2-isopropyl thioxanthone, 4-isopropyl thioxanthone).

Among them, thioxanthones are preferable.

The sensitizer may be used singly or in a combination of two or more compounds.

From the viewpoint of curability and uniformity of the degree of curing within a cured film, the content of the polymerization initiator in the ink composition of the present invention is preferably 0.01 to 35 wt % relative to the total content of polymerizable compounds, more preferably 0.5 to 20 wt %, and yet more preferably 1.0 to 15 wt %.

Furthermore, when a sensitizer is used, the total content of the polymerization initiator relative to the content of the sensitizer is preferably in the range of 200:1 to 1:200 as a ratio by weight of polymerization initiator:sensitizer, more preferably 50:1 to 1:50, and yet more preferably 20:1 to 1:5.

When a sensitizer is used, from the viewpoint of ink coloration properties, the content of the sensitizer in the ink composition of the present invention is preferably 0.01 to 20 wt % relative to the total weight of the ink, more preferably 0.1 to 15 wt %, and yet more preferably 0.5 to 10 wt %.

(Component 2-D) Polyfunctional Vinyl Ether Compound

The ink composition of the present invention preferably comprises (Component 2-D) a polyfunctional vinyl ether compound. 'Polyfunctional' means di- or higher-functional.

From the viewpoint of curability, Component 2-D is preferably a di- to tetra-functional vinyl ether compound, and more preferably a difunctional vinyl ether compound.

As the polyfunctional vinyl ether compound, di- or tri-vinyl ether compounds are shown below as examples.

Examples of vinyl ether compounds suitably used include di- or tri-vinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexanedimethanol divinyl ether, and trimethylolpropane trivinyl ether.

A difunctional vinyl ether compound having an ethylene glycol chain is particularly preferable, and in this case a cured film has excellent flexibility and an image has excellent surface gloss. Preferred examples thereof include diethylene glycol divinyl ether, triethylene glycol divinyl ether, and tetraethylene glycol divinyl ether, and more preferred examples include triethylene glycol divinyl ether.

The content of the polyfunctional vinyl ether compound in the ink composition of the present invention is preferably 1 to 15 wt % relative to the entire weight of the ink composition, more preferably 1.5 to 10 wt %, yet more preferably 2 to 8 wt %, and particularly preferably 2.5 to 5 wt %. When in the above-mentioned range, an ink composition having excellent curability and excellent surface gloss for an image is obtained.

(Component 2-E) Monofunctional (Meth)Acrylate Compound Having Chain-Form Hydrocarbon Group Having 8 to 13 Carbons From the viewpoint of improvement of the surface gloss of a printed material, the ink composition of the present invention preferably comprises (Component 2-E) a monofunctional (meth)acrylate compound having a chain-form hydrocarbon group having 8 to 13 carbons.

The chain-form hydrocarbon group in Component 2-E may be a straight-chain hydrocarbon group or a branched hydrocarbon group, but is preferably a branched hydrocarbon group.

Specific preferred examples of (Component 2-E) the monofunctional (meth)acrylate compound having a chain-form hydrocarbon group having 8 to 13 carbons and a preferred range for the number of carbons of the chain-form hydrocarbon group are the same as the specific preferred examples of (Component 1-E) the monofunctional (meth)acrylate compound having a chain-form hydrocarbon group having 8 to 13 carbons above and the preferred range for the number of carbons of the chain-form hydrocarbon group in Component 1-E respectively.

With regard to Component 2-E, one type thereof may be used on its own or two or more types thereof may be used in combination.

The content of Component 2-E in the ink composition of the present invention is preferably 1 to 25 wt % relative to the entire weight of the ink composition, more preferably 2 to 20 wt %, and yet more preferably 3 to 15 wt %. When in the above-mentioned range, an ink composition that can give a cured film with little tackiness and an image having excellent surface gloss is obtained.

(Component 2-F) N-Vinylcaprolactam

The ink composition of the present invention comprises (Component 2-F) N-vinylcaprolactam. A preferred mode for (Component 2-F) N-vinylcaprolactam is same as the preferred mode for (Component 1-A) N-vinylcaprolactam.

Component 2-F may be used singly or in a combination of two or more compounds.

The content of Component 2-F is, relative to the total weight of the ink composition, preferably 1 to 25 wt %, more preferably 2 to 20 wt %, yet more preferably 3 to 15 wt %. When in the above-mentioned range, the cured film outermost surface alone can be selectively maintained in a liquid state for a long period of time while strongly promoting the curability of the interior of the image, and a printed material having high surface gloss and little stripe unevenness is obtained. Moreover, a ink composition having excellent substrate adhesion is obtained.

(Component 2-G) Surfactant

The ink composition of the present invention may have a surfactant added for imparting stable discharge properties over a long period of time.

From the viewpoint of surface gloss and suppressing stripe unevenness, the ink composition of the present invention preferably either does not comprise a silicone-based surfactant or a fluorine-based surfactant or comprises a silicone-based surfactant and a fluorine-based surfactant at a total content of greater than 0 wt % but no greater than 0.01 wt % relative to the entire weight of the ink composition, more preferably either does not comprise them or comprises them at greater than 0 wt % but no greater than 0.005 wt %, and particularly preferably does not comprise them.

As a surfactant other than silicone-based and fluorine-based surfactants, those described in JP-A-62-173463 and JP-A-62-183457 can be cited. Examples thereof include an anionic surfactant such as a dialkyl sulfosuccinate salt, an alkylnaphthalene sulfonic acid salt, or a fatty acid salt, a nonionic surfactant such as a polyoxyethylene alkyl ether, a polyoxyethylene alkyl allyl ether, an acetylene glycol, or a polyoxyethylene-polyoxypropylene block copolymer, and a cationic surfactant such as an alkylamine salt or a quaternary ammonium salt.

The ink composition of the present invention preferably either does not comprise a surfactant other than a silicone-based surfactant and a fluorine-based surfactant or comprises a surfactant other than a silicone-based surfactant and a fluorine-based surfactant at a total content of greater than 0 wt % but no greater than 0.01 wt % relative to the entire weight of the ink composition, more preferably either does not comprise it or comprises it at greater than 0 wt % but no greater than 0.005 wt %, and particularly preferably does not comprise it.

(Component 2-H) Oligomer

The ink composition of the present invention preferably comprises (Component 2-H) an oligomer.

A preferred mode for (Component 2-H) the oligomer is the same as the preferred mode for (Component 1-F) the oligomer.

(Component 2-I) Other Polymerizable Compound

The ink composition of the present invention may comprise a polymerizable compound other than Component 2-A, Component 2-B, Component 2-D, Component 2-E, and Component 2-H.

As the other polymerizable compound, an ethylenically unsaturated compound is preferable.

As the other polymerizable compound, a known polymerizable compound may be used, and examples thereof include a (meth)acrylate compound, a vinyl ether compound, an allyl compound, an N-vinyl compound, and an unsaturated carboxylic acid other than Component A, Component B, and Component 2-D. Examples thereof include radically polymerizable monomers described in JP-A-2009-221414, polymerizable compounds described in JP-A-2009-209289, and ethylenically unsaturated compounds described in JP-A-2009-191183.

As the other polymerizable compound, a (meth)acrylate compound is preferable and an acrylate compound is more preferable.

Specific preferred examples of the other polymerizable compound include phenoxyethyl (meth)acrylate and propylene oxide (PO)-modified neopentyl glycol di(meth)acrylate.

Moreover, the ink composition of the present invention preferably comprises a polyfunctional polymerizable compound as the other polymerizable compound, and more preferably comprise a polyfunctional (meth)acrylate compound.

Preferred examples of the other polymerizable compound include an aromatic group-containing monofunctional (meth)acrylate compound.

Specific preferred examples of the aromatic group-containing monofunctional (meth)acrylate compound include the preferred examples described at Component 1-I.

Examples of the other polymerizable compound include unsaturated carboxylic acids such as acrylic acid, methacrylic acid, itaconic acid, crotonic acid, isocrotonic acid, and maleic acid, and salts thereof, an ethylenically unsaturated group-containing anhydride, acrylonitrile, styrene and, furthermore, radically polymerizable compounds such as various types of unsaturated polyesters, unsaturated polyethers, unsaturated polyamides, and unsaturated urethane.

Examples of other polymerizable compound include (meth)acrylic acid derivatives such as 2-ethylhexyl(meth)acrylate, 2-hydroxyethyl(meth)acrylate, butoxyethyl(meth)acrylate, carbitol (meth)acrylate, cyclohexyl (meth)acrylate, tetrahydrofurfuryl (meth)acrylate, benzyl (meth)acrylate, methyl (meth)acrylate, n-butyl (meth)acrylate, allyl (meth)acrylate, glycidyl (meth)acrylate, dimethylaminomethyl (meth)acrylate, bis(4-(meth)acryloxypolyethoxyphenyl)propane, neopentyl glycol di(meth)acrylate, PO-modified neopentyl glycol di(meth)acrylate, 1,6-hexanediol di(meth)acrylate, ethylene glycol di(meth)acrylate, diethylene glycol di(meth)acrylate, triethylene glycol di(meth)acrylate, tetraethylene glycol di(meth)acrylate, polyethylene glycol di(meth)acrylate, polypropylene glycol di(meth)acrylate, pentaerythritol tri(meth)acrylate, pentaerythritol tetra(meth)acrylate, dipentaerythritol tetra(meth)acrylate, trimethylolethane tri(meth)acrylate, trimethylolpropane tri(meth)acrylate, tetramethylolmethane tetra(meth)acrylate, oligoester (meth)acrylate, 2,2-bis(4-(meth)acryloxypolyethoxyphenyl) propane, N-methylol (meth)acrylamide, diacetone (meth) acrylamide, and epoxy (meth)acrylate, allyl compound derivatives such as allyl glycidyl ether, diallyl phthalate, triallyl trimellitate, etc.

More specifically, commercially available or industrially known radically polymerizable or crosslinking monomers, oligomers, and polymers, such as those described in 'Kakyozai Handobukku' (Crosslinking Agent Handbook), Ed. S. Yamashita (Taiseisha, 1981); 'UV/EB Koka Handobukku (Genryo)' (UV/EB Curing Handbook (Starting Materials)) Ed. K. Kato (Kobunshi Kankoukai, 1985); 'UV/EB Koka Gijutsu no Oyo to Shijyo' (Application and Market of UV/EB Curing Technology), p. 79, Ed. RadTech (CMC, 1989); and E. Takiyama 'Poriesuteru Jushi Handobukku' (Polyester Resin Handbook), (The Nikkan Kogyo Shimbun Ltd., 1988) may be used.

The molecular weight of the other polymerizable monomer is preferably 80 to 2,000 and more preferably 80 to 1,000, and yet more preferably 80 to 800.

As other polymer compound, monofunctional vinyl ether compounds is preferable.

Specific examples of monofunctional vinyl ether compounds include ethylene glycol monovinyl ether, triethylene glycol monovinyl ether, hydroxyethyl monovinyl ether, ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, hydroxynonyl monovinyl ether, cyclohexane dimethanol monovinyl ether, diethylene glycol monovinyl ether, n-propyl vinyl ether, isopropyl vinyl ether, dodecyl vinyl ether, and diethyrene glycol monovinyl ether.

When the ink composition of the present invention comprises other polymer compound, the content, the content of the other polymer compound in ink composition of the present invention is preferably 1 to 30 wt % relative to the total weight of the ink, more preferably 3 to 25 wt %, and particularly preferably 5 to 20 wt %.

(Component 2-J) Colorant

The ink composition of the present invention preferably comprises a colorant in order to improve visibility of formed image.

A preferred mode for (Component 2-J) the colorant is the same as the preferred mode for (Component 1-K) the colorant.

(Component 2-K) Dispersant

The ink composition of the present invention preferably comprises a dispersant.

A preferred mode for (Component 2-K) the dispersant is the same as the preferred mode for (Component 1-L) the dispersant.

Other Components

The ink composition of the present invention may comprise as necessary, in addition to the above-mentioned components, a co-sensitizer, a UV absorber, an antioxidant, an antifading agent, a conductive salt, a solvent, a polymer compound, a basic compound, etc. They are described in JP-A-2009-221416 and may be used in the present invention as well.

Furthermore, from the viewpoint of storage properties and suppression of head clogging, the ink composition of the present invention preferably comprises a polymerization inhibitor.

The polymerization inhibitor is preferably added at 200 to 20,000 ppm relative to the total amount of the ink composition.

Examples of the polymerization inhibitor include a nitroso-based polymerization inhibitor, a hindered amine-based polymerization inhibitor, hydroquinone, benzoquinone, p-methoxyphenol, TEMPO, TEMPOL, and Al cupferron.

Ink Physical Properties

A preferred viscosity for the ink composition in the second embodiment of the present invention is the same as the above-mentioned preferred viscosity for the ink composition in the first embodiment.

An inkjet recording method using the ink composition in the first or second embodiment of the present invention, inkjet recording equipment, and a printed material are now explained.

(Inkjet Recording Method, Inkjet Recording Device, and Printed Material)

The ink composition of the present invention is suitably used for inkjet recording.

The inkjet recording method of the present invention is a method for forming an image by discharging the ink composition of the present invention onto a recording medium (support, recording material, etc.) for inkjet recording and curing the ink by irradiating the ink composition so discharged onto the recording medium with actinic radiation.

More specifically, the inkjet recording method of the present invention preferably comprises ($a^1$) a step of discharging the inkjet ink composition of the present invention onto a recording medium, and ($b^1$) a step of curing the inkjet ink composition by irradiating the discharged inkjet ink composition with actinic radiation.

Due to the inkjet recording method of the present invention comprising steps ($a^1$) and ($b^1$) above, an image is formed by the ink composition cured on a recording medium.

Furthermore, when the ink composition in the second embodiment of the present invention in particular is used, the inkjet recording method of the present invention is preferably carried out by subjecting the same area of a recording medium to steps ($a^1$) and ($b^1$) above two or more times, that is, in a multipass mode in which the same area is printed by overprinting. In accordance with the use of the ink composition of the present invention, when printing is carried out in multipass mode, an image having excellent surface gloss is obtained.

Furthermore, the printed material of the present invention is a printed material recorded by the inkjet recording method of the present invention.

In the step ($a^1$) in the inkjet recording method of the present invention, an inkjet recording device described in detail below may be used.

Inkjet Recording Device

An inkjet recording device used in the inkjet recording method of the present invention is not particularly limited, and any known inkjet recording device that can achieve an intended resolution may be used. That is, any known inkjet recording device, such as a commercial product, may be used in order to discharge an ink composition onto a recording medium (support) in step ($a^1$) of the inkjet recording method of the present invention.

The inkjet recording device that can be used in the present invention is equipped with, for example, an ink supply system, a temperature sensor, and an actinic radiation source.

The ink supply comprises, for example, a main tank containing the ink composition of the present invention, a supply pipe, an ink composition supply tank immediately before an inkjet head, a filter, and a piezo system inkjet head. The piezo system inkjet head may be driven so as to discharge a multi-size dot of preferably 1 to 100 pL, more preferably 3 to 42 pL, and yet more preferably 8 to 30 pL, at a resolution of preferably 320×320 to 4,000×4,000 dpi, more preferably 400×400 to 1,600×1,600 dpi, and yet more preferably 720×720 dpi. Here, dpi referred to in the present invention means the number of dots per 2.54 cm.

As described above, with respect to the radiation curing ink composition such as the ink composition of the present invention, since it is desirable for the ink composition to be discharged at a constant temperature, a section from the ink composition supply tank to the inkjet head is thermally insulated and heated. A method of controlling temperature is not particularly limited, but it is preferable to provide, for example, temperature sensors at a plurality of pipe section positions, and control heating according to the ink composition flow rate and the temperature of the surroundings. The temperature sensors may be provided on the ink composition supply tank and in the vicinity of the inkjet head nozzle. Furthermore, the head unit that is to be heated is preferably thermally shielded or insulated so that the device main body is not influenced by the temperature of the outside air. In order to reduce the printer start-up time required for heating, or in order to reduce the thermal energy loss, it is preferable to thermally insulate the head unit from other sections and also to reduce the heat capacity of the entire heated unit.

When the ink composition or the inkjet recording ink composition of the present invention is discharged using the above mentioned inkjet recording device, the ink composition is preferably discharged after being heated to preferably 25° C. to 80° C., and more preferably 25° C. to 50° C., so as to reduce the viscosity of the ink composition to preferably 3 to 15 mPa·s, and more preferably 3 to 13 mPa·s. In particular, it is preferable to use the ink composition having an ink viscosity at 25° C. of no more than 50 mPa·s since good discharge stability can be obtained. By employing this method, high discharge stability can be realized.

The radiation curing type ink composition such as the ink composition of the present invention generally has a viscosity that is higher than that of a normal ink composition or a water-based ink composition used for an inkjet recording ink composition, and variation in viscosity due to a change in temperature at the time of discharge is large. Viscosity variation in the ink composition has a large effect on changes in liquid droplet size and changes in liquid droplet discharge speed and, consequently, causes the image quality to be degraded. It is therefore necessary to maintain the ink composition discharge temperature as constant as possible. In the present invention, the control range for the temperature of ink composition is preferably ±5° C. of a set temperature, more preferably ±2° C. of the set temperature, and yet more preferably ±1° C. of the set temperature.

The curing step ($b^2$) of irradiating the image thus obtained with actinic radiation so as to cure the inkjet ink composition and obtain a printed material having the image cured on the support are explained.

The ink composition discharged onto the recording medium cures upon exposure to actinic radiation. This is due to a initiating species such as a radical being generated by decomposition of the photopolymerization initiator contained in the ink composition of the present invention by irradiation with actinic radiation, the initiating species functioning so as to make a polymerization reaction of a radically polymerizable compound take place and to promote it. In this process, if a sensitizer is present together with the polymerization initiator in the ink composition, the sensitizer in the system absorbs actinic radiation, becomes excited, and promotes decomposition of the polymerization initiator by contact with the polymerization initiator, thus enabling a curing reaction with higher sensitivity to be achieved.

The actinic radiation used in this process may include α rays, γ rays, an electron beam, X rays, UV rays, visible light, and IR rays. Although it depends on the absorption characteristics of the sensitizing dye, the peak wavelength of the actinic radiation is preferably 200 to 600 nm, more preferably 320 to 420 nm, and particularly preferably 340 to 400 nm.

Furthermore, in the present invention, the photopolymerization initiation system has sufficient sensitivity for low output actinic radiation. The actinic radiation is applied therefore so that the illumination intensity on the exposed surface is preferably 10 to 4,000 mW/cm$^2$, and more preferably 20 to 2,500 mW/cm$^2$.

As an actinic radiation source, a mercury lamp, a gas/solid laser, etc. are mainly used, and for UV photocuring inkjet ink a mercury lamp and a metal halide lamp are widely known. However, from the viewpoint of protection of the environment, there has recently been a strong desire for mercury not to be used, and replacement by a GaN semiconductor UV light emitting device is very useful from industrial and environmental viewpoints. Furthermore, LEDs (UV-LED) and LDs (UV-LD) have small dimensions, long life, high efficiency, and low cost, and their use as a photocuring inkjet light source can be expected.

Furthermore, light-emitting diodes (LED) and laser diodes (LD) may be used as the source of actinic radiation. In particular, when a UV ray source is needed, a UV-LED or a UV-LD may be used. For example, Nichia Corporation has marketed a violet LED having a wavelength of the main emission spectrum of between 365 nm and 420 nm. Furthermore, when a shorter wavelength is needed, the example of the LED includes a LED, disclosed in U.S. Pat. No. 6,084,250, that can emit actinic radiation whose wavelength is centered between 300 nm and 370 nm. Furthermore, another violet LED is available, and irradiation can be carried out with radiation of a different UV bandwidth. The actinic radiation source preferable in the present invention is a UV-LED, and a UV-LED having a peak wavelength at 350 to 420 nm is particularly preferable.

The maximum illumination intensity of the LED on a recording medium is preferably 10 to 2,000 mW/cm$^2$, more preferably 20 to 1,000 mW/cm$^2$, and particularly preferably 50 to 800 mW/cm$^2$.

The ink composition of the present invention is desirably exposed to such actinic radiation for preferably 0.01 to 120 sec., more preferably 0.01 to 90 sec., and yet more preferably 0.01 to 10 sec.

Irradiation conditions and a basic method for irradiation with actinic radiation are disclosed in JP-A-60-132767. Specifically, a light source is provided on either side of a head unit that includes an ink composition discharge device, and the head unit and the light source are made to scan by a so-called shuttle system. Irradiation with actinic radiation is carried out after a certain time (preferably 0.01 to 0.5 sec., more preferably 0.01 to 0.3 sec., and yet more preferably 0.01 to 0.15 sec.) has elapsed from when the ink composition has landed. By controlling the time from ink composition landing to irradiation so as to be a minimum in this way, it becomes possible to prevent the ink composition that has landed on a recording medium from spreading before being cured. Furthermore, since the ink composition can be exposed before it reaches a deep area of a porous recording medium that the light source cannot reach, it is possible to prevent monomer from remaining unreacted.

Furthermore, curing may be completed using another light source that is not driven. WO99/54415 discloses, as an irradiation method, a method employing an optical fiber and a method in which a collimated light source is incident on a mirror surface provided on a head unit side face, and a recorded area is irradiated with UV light.

By employing such a inkjet recording method as described above, it is possible to maintain a uniform dot diameter for landed ink composition even for various types of recording medium (support) having different surface wettability, thereby improving the image quality. In order to obtain a color image, it is preferable to superimpose colors in order from those with a high lightness. By superimposing ink compositions in order from one with high lightness, it is easy for radiation to reach a lower ink composition, the curing sensitivity is good, the amount of residual monomer decreases, and an improvement in adhesion can be expected. Furthermore, although it is possible to discharge all colors and then expose them at the same time, it is preferable to expose one color at a time from the viewpoint of promoting curing.

In this way the ink composition of the present invention may be cured by irradiation with actinic radiation in high sensitivity and form an image on the surface of the recording medium.

The inkjet recording method of the present invention may suitably employ the ink set comprising at least one ink composition of the present invention. The order in which colored ink compositions are discharged is not particularly limited, but it is preferable to apply to a recording medium from a colored ink composition having a high lightness; when the ink compositions of yellow, cyan, magenta, and black are used, they are preferably applied on top of the recording medium in the order yellow→cyan→magenta→black. Furthermore, when white is additionally used, they are preferably applied on top of the recording medium in the order white→yellow→cyan→magenta→black. Moreover, the present invention is not limited thereto, and an ink set comprising a total of seven colors, that is, light cyan, light magenta ink compositions and cyan, magenta, black, white, and yellow dark ink compositions may preferably be used, and in this case they are applied on top of the recording medium in the order white→light cyan→light magenta→yellow→cyan→magenta→black.

In the present invention, the recording medium is not particularly limited, and a recording medium known as a support and a recording material may be used. Examples thereof include paper, paper laminated with a plastic (e.g. polyethylene, polypropylene, polystyrene, etc.), a metal plate (e.g. aluminum, zinc, copper, etc.), a plastic film (e.g. cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinylacetal, etc.), and paper or plastic film laminated or vapor-deposited with the above metal. In the present invention, as the recording medium, a non-absorbing recording medium may suitably be used.

In accordance with the present invention, there can be provided an inkjet ink composition that can give a printed material having inconspicuous stripe unevenness and excellent surface gloss, and an inkjet recording method and a printed material employing the inkjet ink composition.

EXAMPLES

The present invention is explained below more specifically by reference to Examples and Comparative Examples. However, the present invention should not be construed as being limited by these Examples. 'Parts' in the description below means 'parts by weight' unless otherwise specified.

Materials used in the present invention are as follows.
Materials used in the present invention were as follows.
IRGALITE BLUE GLVO (cyan pigment, Ciba Specialty Chemicals)
CINQUASIA MAGENTA RT-355-D (magenta pigment, Ciba Specialty Chemicals)
NOVOPERM YELLOW H2G (yellow pigment, Clariant)
SPECIAL BLACK 250 (black pigment, Ciba Specialty Chemicals)
TIPAQUE CR60-2 (white pigment, Ishihara Sangyo Kaisha Ltd.)
SOLSPERSE 32000 (dispersant, Noveon)
SOLSPERSE 36000 (dispersant, Noveon)
V-CAP (N-vinylcaprolactam, ISP)
SR9003 (propylene glycol-modified neopentyl glycol diacrylate, Sartomer)
SR506 (isobornyl acrylate, Sartomer)
SR531 (cyclic trimethylolpropane formal acrylate, Sartomer)
SR395 (isodecyl acrylate, Sartomer)
SR440 (isooctyl acrylate, Sartomer)
SR489 (tridecyl acrylate, Sartomer)
SR339 (phenoxyethyl acrylate, Sartomer)
RAPI-CURE DVE-3 (triethylene glycol divinyl ether, ISP Japan Ltd.)
SR341 (3-methyl-1,5-pentanediol diacrylate, Sartomer)
SR247 (neopentyl glycol diacrylate, Sartomer)
SR238 (hexanediol diacrylate, Sartomer)
NK Ester 1,9-NDA (1,9-nonanediol diacrylate, Shin-Nakamura Chemical Co., Ltd.)
CD595 (decanediol diacrylate, Sartomer)
CN964 A85 (difunctional aliphatic urethane acrylate containing 15 wt % of tripropylene glycol diacrylate, Sartomer)
FIRSTCURE ST-1 (polymerization inhibitor, mixture of tris (N-nitroso-N-phenylhydroxyamine) aluminum salt (10 wt %) and phenoxyethyl acrylate (90 wt %), Chem First)
LUCIRIN TPO (photopolymerization initiator, 2,4,6-trimethylbenzoyldiphenylphosphine oxide, BASF)
IRGACURE 184 (photopolymerization initiator, 1-hydroxycyclohexyl phenyl ketone, Ciba-Geigy Ltd.)
SPEEDCURE ITX (photopolymerization initiator, isopropylthioxanthone, LAMBSON)
TEGORAD 2100 (silicone-based surfactant, Degussa)
FLUORAD FC431 (fluorine-based surfactant, 3M)
IRGACURE 819 (bisacylphosphine initiator, Ciba-Geigy Ltd.)
IRGACURE 369 (alpha-aminoketone-based initiator, Ciba-Geigy Ltd.)
Compound A (thiochromanone compound below)

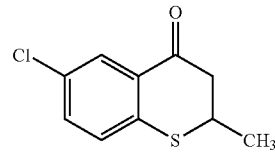

Compound A

Preparation of Cyan Mill Base A 300 parts by weight of IRGALITE BLUE GLVO, 600 parts by weight of SR9003, and 100 parts by weight of SOLSPERSE 32000 were mixed by stirring, thus giving cyan mill base A. Preparation of cyan mill base A was carried out by dispersing using a Motor Mill M50 disperser (Eiger Machinery, Inc.) with zirconia beads having a diameter of 0.65 mm at a peripheral speed of 9 m/s for 4 hours.

Preparation of Magenta Mill Base B 300 parts by weight of CINQUASIA MAGENTA RT-355 D, 600 parts by weight of SR9003, and 100 parts by weight of SOLSPERSE 32000 were mixed by stirring, thus giving magenta mill base B. Preparation of magenta mill base B was carried out by dispersing using a Motor Mill M50 disperser (Eiger Machinery, Inc.) with zirconia beads having a diameter of 0.65 mm at a peripheral speed of 9 m/s for 10 hours.

Preparation of Yellow Mill Base C 300 parts by weight of NOVOPERM YELLOW H2G, 600 parts by weight of SR9003, and 100 parts by weight of SOLSPERSE 32000 were mixed by stirring, thus giving yellow mill base C. Preparation of yellow mill base C was carried out by dispersing using a Motor Mill M50 disperser (Eiger Machinery, Inc.) with zirconia beads having a diameter of 0.65 mm at a peripheral speed of 9 m/s for 10 hours.

Preparation of Black Mill Base D 400 parts by weight of SPECIAL BLACK 250, 500 parts by weight of SR9003, and 100 parts by weight of SOLSPERSE 32000 were mixed by stirring, thus giving black mill base D. Preparation of black mill base D was carried out by dispersing using a Motor Mill M50 disperser (Eiger Machinery, Inc.) with zirconia beads having a diameter of 0.65 mm at a peripheral speed of 9 m/s for 7 hours.

Preparation of White Mill Base E 500 parts by weight of TIPAQUE CR60-2, 440 parts by weight of SR9003, and 60 parts by weight of SOLSPERSE 36000 were mixed by stirring, thus giving white mill base E. Preparation of white mill base E was carried out by dispersing using a Motor Mill M50 disperser (Eiger Machinery, Inc.) with zirconia beads having a diameter of 0.65 mm at a peripheral speed of 9 m/s for 4 hours.

Examples 1-1-1 to 1-1-22 and Comparative Examples 1-1-1 to 1-1-11

First Embodiment of the Present Invention

Method for Preparation of Ink Composition

The materials described in Table 1 to Table 5 were mixed by stirring, thus giving ink compositions. For the pigment addition, mill bases A to E above were used.

The inkjet recording method and the various types of evaluation described below were carried out using the ink compositions thus obtained. The evaluation results are shown in Table 1 to Table 5 below.

Inkjet Recording Method

An inkjet image was printed using an Acuity Advance UV-curing type inkjet printer (FUJIFILM Corporation).

A 100% solid image was printed on coated paper (Oji Paper Co., Ltd.) at a resolution of 600×450 dpi with a size of 2 m×1 m. A lamp was equipped with SUB ZERO 085 H bulb lamp units manufactured by Integration Technology, and front and rear lamp intensity was set at level 5.

When the exposure area illumination intensity was measured during printing it was found to be 960 mW/cm$^2$. Furthermore, the time from discharge until exposure was 0.2 to 0.3 sec. The amount discharged per drop was in the range of 6 to 42 pL.

Evaluation of Surface Gloss

Measurement was carried out for an image obtained by the above-mentioned inkjet recording method by means of a surface gloss meter manufactured by Sheen Instruments Ltd. at a measurement angle of 60°. The evaluation criteria were as follows.
4: a surface gloss of at least 40
3: a surface gloss of at least 30 but less than 40
2: a surface gloss of at least 20 but less than 30
1: a surface gloss of less than 20

Evaluation of Image Stripe Unevenness

The stripe unevenness of an image obtained by the above-mentioned inkjet recording method was evaluated by eye from a position 2 m away from the image. The evaluation criteria were as follows.
3: stripe unevenness could not be clearly seen by eye.
2: slight stripe unevenness could be seen by eye.
1: stripe unevenness could be clearly seen by eye.

Evaluation of Curability

The degree of tackiness of an image obtained by the above-mentioned inkjet recording method was evaluated by touch using the criteria below.
3: there was no tackiness on the image.
2: the image was slightly tacky, but uncured ink composition or cured film did not transfer to the hand.
1: the image was tacky, and some uncured ink composition or cured film transferred to the hand.

Method for Evaluation of Flexibility: Bending Test

In the present embodiment, as a method for evaluating the flexibility of a cured film, a bending test was carried out.

100% and 200% solid images were formed by the above-mentioned inkjet recording method and evaluation was carried out using the criteria below.
3: no cracks occurred for 100% and 200% samples.
2: no cracks occurred for the 100% sample, but cracks occurred in the bent part of an image area for the 200% average film thickness sample.
1: cracks occurred in the bent part of an image area for both 100% and 200% average film thickness samples.

Method for Evaluation of Substrate Adhesion: Cross-Cut and Tape Peel-Off Test

A printed material was prepared by the same method as in the description for the inkjet recording method above except that the support was changed to a PET substrate (Veralite 100, Veralite, thickness 8 mm) or an acrylic resin substrate (Repsol Glass, Repsol, thickness 22 mm).

A cross-cut tape peel-off test was carried out in accordance with ASTM D3359 DIN53 151, and evaluation was carried out using the criteria below.
5: peeled-off area of the image was less than 1%.
4: peeled-off area of the image was at least 1% but less than 5%.
3: peeled-off area of the image was at least 5% but less than 10%.
2: peeled-off area of the image was at least 10% but less than 30%.
1: peeled-off area of the image was at least 30%.

TABLE 1

|  |  |  | Ex. 1-1-1 Cyan | Ex. 1-1-2 Magenta | Ex. 1-1-3 Yellow | Ex. 1-1-4 Black | Ex. 1-1-5 White |
| --- | --- | --- | --- | --- | --- | --- | --- |
| Pigment |  | Cyan pigment | 2.46 | — | — | — | — |
|  |  | Magenta pigment | — | 4.8 | — | — | — |
|  |  | Yellow pigment | — | — | 3.75 | — | — |
|  |  | Black pigment | — | — | — | 3.6 | — |
|  |  | White pigment | — | — | — | — | 15 |
| Dispersant |  | SOLSPERSE 32000 | 0.82 | 1.6 | 1.25 | 0.9 | — |
|  |  | SOLSPERSE 36000 | — | — | — | — | 1.8 |
| Monomer | Component 1-A | N-Vinylcaprolactam | 14.5 | 14.5 | 14.5 | 14.5 | 14.5 |
|  | Component 1-D | Isobornyl acrylate | 34 | 29 | 30 | 32 | 28 |
|  | Component 1-B | CTFA | 15 | 13 | 13 | 15 | 12 |
|  | Component 1-E | Isodecyl acrylate | 7.08 | 10.9 | 8.9 | 8.4 | 2.1 |
|  | Other monomer | PO-modified NPGDA | 5.04 | 9.6 | 7.5 | 4.5 | 13.2 |

TABLE 1-continued

|  |  | Ex. 1-1-1 Cyan | Ex. 1-1-2 Magenta | Ex. 1-1-3 Yellow | Ex. 1-1-4 Black | Ex. 1-1-5 White |
|---|---|---|---|---|---|---|
| Oligomer | CN964 A85 | 4.5 | — | 4.5 | 4.5 | — |
| Polymerization inhibitor | FIRSTCURE ST-1 (Al salt only) | 0.4 | 0.4 | 0.4 | 0.4 | 0.4 |
| Polymerization initiator | IRGACURE 184 | 3.5 | 4.5 | 4.5 | 3.5 | 3.5 |
|  | LUCIRIN TPO | 9.5 | 8.5 | 8.5 | 9.5 | 8.5 |
|  | SPEEDCURE ITX | 3.2 | 3.2 | 3.2 | 3.2 | 1 |
| Component 1-B and component 1-D total content |  | 49 | 42 | 43 | 47 | 40 |
|  | Total | 100 | 100 | 100 | 100 | 100 |
| Performance evaluation results | Surface gloss | 4 | 4 | 4 | 4 | 4 |
|  | Image stripe unevenness | 3 | 3 | 3 | 3 | 3 |
|  | Curability | 3 | 3 | 3 | 3 | 3 |
|  | Flexibility | 3 | 3 | 3 | 3 | 3 |
|  | Substrate adhesion (PET substrate) | 5 | 5 | 5 | 5 | 5 |
|  | Substrate adhesion (acrylic resin substrate) | 5 | 5 | 5 | 5 | 5 |

TABLE 2

|  |  | Ex. 1-1-1 Cyan | Ex. 1-1-6 Cyan | Ex. 1-1-7 Cyan | Ex. 1-1-8 Cyan | Ex. 1-1-9 Cyan | Ex. 1-1-10 Cyan | Ex. 1-1-11 Cyan | Ex. 1-1-12 Cyan | Ex. 1-1-13 Cyan |
|---|---|---|---|---|---|---|---|---|---|---|
| Pigment | Cyan pigment | 2.46 | 2.46 | 2.46 | 2.46 | 2.46 | 2.46 | 2.46 | 2.46 | 2.46 |
| Dispersant | SOLSPERSE 32000 | 0.82 | 0.82 | 0.82 | 0.82 | 0.82 | 0.82 | 0.82 | 0.82 | 0.82 |
|  | SOLSPERSE 36000 | — | — | — | — | — | — | — | — | — |
| Monomer Component 1-A | N-Vinylcaprolactam | 14.5 | 14.5 | 14.5 | 11.5 | 14.5 | 14.5 | 14.5 | 6.43 | 2 |
| Component 1-D | Isobornyl acrylate | 34 | 14 | 24 | 50 | 34 | 34 | 28 | 35 | 41.43 |
| Component 1-B | CTFA | 15 | 23 | 15 | 9 | 3 | 10 | 24 | 31.65 | 31.65 |
| Component 1-E | Isodecyl acrylate | 7.08 | 7.08 | 7.08 | 4.58 | 7.08 | 7.08 | 4.08 | — | — |
|  | Isooctyl acrylate | — | — | — | — | — | — | — | — | — |
|  | Tridecyl acrylate | — | — | — | — | — | — | — | — | — |
| Other monomer | PO-modified NPGDA | 5.04 | 17 | 15 | 5.04 | 17 | 10 | 5.04 | 5.04 | 5.04 |
| Oligomer | CN964 A85 | 4.5 | 4.5 | 4.5 | — | 4.5 | 4.5 | 4.5 | 2 | — |
| Polymerization inhibitor | FIRSTCURE ST-1 (Al salt only) | 0.4 | 0.4 | 0.4 | 0.4 | 0.4 | 0.4 | 0.4 | 0.4 | 0.4 |
| Polymerization initiator | IRGACURE 184 | 3.5 | 3.5 | 3.5 | 3.5 | 3.5 | 3.5 | 3.5 | 3.5 | 3.5 |
|  | LUCIRIN TPO | 9.5 | 9.5 | 9.5 | 9.5 | 9.5 | 9.5 | 9.5 | 9.5 | 9.5 |
|  | SPEEDCURE ITX | 3.2 | 3.2 | 3.2 | 3.2 | 3.2 | 3.2 | 3.2 | 3.2 | 3.2 |
| Component 1-B and component 1-D total content |  | 49 | 37 | 39 | 59 | 37 | 44 | 52 | 66.65 | 73.08 |
|  | Total | 100 | 100 | 100 | 100 | 100 | 100 | 100 | 100 | 100 |
| Performance evaluation results | Surface gloss | 4 | 3 | 4 | 4 | 4 | 4 | 4 | 3 | 3 |
|  | Image stripe unevenness | 3 | 3 | 3 | 3 | 3 | 3 | 3 | 3 | 3 |
|  | Curability | 3 | 3 | 3 | 3 | 3 | 3 | 3 | 3 | 3 |
|  | Flexibility | 3 | 3 | 3 | 2 | 3 | 3 | 3 | 3 | 3 |
|  | Substrate adhesion (PET substrate) | 5 | 5 | 5 | 4 | 4 | 5 | 5 | 5 | 4 |
|  | Substrate adhesion (acrylic resin substrate) | 5 | 5 | 5 | 5 | 4 | 5 | 5 | 5 | 4 |

TABLE 3

|  |  | Ex. 1-1-1 Cyan | Ex. 1-1-14 Cyan | Ex. 1-1-15 Cyan | Ex. 1-1-16 Cyan | Ex. 1-1-17 Cyan | Ex. 1-1-18 Cyan | Ex. 1-1-19 Cyan | Ex. 1-1-20 Cyan | Ex. 1-1-21 Cyan | Ex. 1-1-22 Cyan |
|---|---|---|---|---|---|---|---|---|---|---|---|
| Pigment | Cyan pigment | 2.46 | 2.46 | 2.46 | 2.46 | 2.46 | 2.46 | 2.46 | 2.46 | 2.46 | 2.46 |
| Dispersant | SOLSPERSE 32000 | 0.82 | 0.82 | 0.82 | 0.82 | 0.82 | 0.82 | 0.82 | 0.82 | 0.82 | 0.82 |

TABLE 3-continued

|  |  |  | Ex. 1-1-1 Cyan | Ex. 1-1-14 Cyan | Ex. 1-1-15 Cyan | Ex. 1-1-16 Cyan | Ex. 1-1-17 Cyan | Ex. 1-1-18 Cyan | Ex. 1-1-19 Cyan | Ex. 1-1-20 Cyan | Ex. 1-1-21 Cyan | Ex. 1-1-22 Cyan |
|---|---|---|---|---|---|---|---|---|---|---|---|---|
| Monomer | Component 1-A | N-Vinylcaprolactam | 14.5 | 14.5 | 14.5 | 14.5 | 14.5 | 6.43 | 2 | 14.5 | 14.5 | 14.5 |
|  | Component 1-D | Isobornyl acrylate | 34 | 34 | 34 | 28 | 28 | 30 | 31.43 | 38 | 35.2 | 32.2 |
|  | Component 1-B | CTFA | 15 | 15 | 15 | 24 | 24 | 31.65 | 31.65 | 17.7 | 16 | 15 |
|  | Component 1-E | Isodecyl acrylate | 7.08 | 7.08 | 7.08 | 4.08 | 4.08 | — | — | 7.08 | 7.08 | 7.08 |
|  | Other monomer | PO-modified NPGDA | 5.04 | 5.04 | 5.04 | 5.04 | 5.04 | 10.04 | 15.04 | 5.04 | 5.04 | 5.04 |
| Oligomer |  | CN964 A85 | 4.5 | 4.47 | 4.5 | 4.47 | 4.5 | 2 | — | 4.5 | 4.5 | 4.5 |
| Polymerization inhibitor |  | FIRSTCURE ST-1 (Al salt only) | 0.4 | 0.4 | 0.4 | 0.4 | 0.4 | 0.4 | 0.4 | 0.4 | 0.4 | 0.4 |
| Polymerization initiator |  | IRGACURE 184 | 3.5 | 3.5 | 3.5 | 3.5 | 3.5 | 3.5 | 3.5 | 3.5 | 3.5 | 3.5 |
|  |  | IRGACURE 819 | — | — | — | — | — | — | — | 4.5 | — | — |
|  |  | IRGACURE 369 | — | — | — | — | — | — | — | — | 1 | — |
|  |  | LUCIRIN TPO | 9.5 | 9.5 | 9.5 | 9.5 | 9.5 | 9.5 | 9.5 | 1.5 | 9.5 | 9.5 |
|  |  | Compound A | — | — | — | — | — | — | — | — | — | 5 |
|  |  | SPEEDCURE ITX | 3.2 | 3.2 | 3.2 | 3.2 | 3.2 | 3.2 | 3.2 | — | — | — |
| Surfactant |  | TEGORAD 2100 | — | 0.03 | 0.01 | — | — | — | — | — | — | — |
|  |  | FLUORAD FC430 | — | — | — | 0.03 | 0.01 | — | — | — | — | — |
| Component 1-B and component 1-D total content |  |  | 49 | 49 | 49 | 52 | 52 | 61.65 | 63.08 | 55.7 | 51.2 | 47.2 |
| Total |  |  | 100 | 100 | 100 | 100 | 100 | 100 | 100 | 100 | 100 | 100 |
| Performance evaluation results | Surface gloss |  | 4 | 3 | 4 | 3 | 4 | 3 | 3 | 4 | 3 | 4 |
|  | Image stripe unevenness |  | 3 | 3 | 3 | 3 | 3 | 3 | 3 | 3 | 3 | 3 |
|  | Curability |  | 3 | 3 | 3 | 3 | 3 | 3 | 3 | 3 | 3 | 3 |
|  | Flexibility |  | 3 | 3 | 3 | 3 | 3 | 3 | 3 | 3 | 3 | 3 |
|  | Substrate adhesion (PET substrate) |  | 5 | 5 | 5 | 5 | 5 | 5 | 4 | 5 | 5 | 5 |
|  | Substrate adhesion (acrylic resin substrate) |  | 5 | 5 | 5 | 5 | 5 | 5 | 4 | 5 | 5 | 5 |

TABLE 4

|  |  |  | Ex. 1-1-1 Cyan | Comp. Ex. 1-1-1 Cyan | Comp. Ex. 1-1-2 Cyan | Comp. Ex. 1-1-3 Cyan | Comp. Ex. 1-1-4 Cyan | Comp. Ex. 1-1-5 Cyan |
|---|---|---|---|---|---|---|---|---|
| Pigment |  | Cyan pigment | 2.46 | 2.46 | 2.46 | 2.46 | 2.46 | 2.46 |
| Dispersant |  | SOLSPERSE 32000 | 0.82 | 0.82 | 0.82 | 0.82 | 0.82 | 0.82 |
|  |  | SOLSPERSE 36000 | — | — | — | — | — | — |
| Monomer | Component 1-A | N-Vinylcaprolactam | 14.5 | — | 14.5 | — | 14.5 | — |
|  | Component 1-D | Isobornyl acrylate | 34 | 34 | 34 | — | — | 34 |
|  | Component 1-B | CTFA | 15 | 15 | — | 15 | — | — |
|  | Component 1-E | Isodecyl acrylate | 7.08 | 7.08 | 7.08 | 7.08 | 7.08 | 7.08 |
|  | Other monomer | Phenoxyethyl acrylate | — | 14.5 | 15 | 48.5 | 49 | 29.5 |
|  |  | PO-modified NPGDA | 5.04 | 5.04 | 5.04 | 5.04 | 5.04 | 5.04 |
| Oligomer |  | CN964 A85 | 4.5 | 4.5 | 4.5 | 4.5 | 4.5 | 4.5 |
| Polymerization inhibitor |  | FIRSTCURE ST-1 (Al salt only) | 0.4 | 0.4 | 0.4 | 0.4 | 0.4 | 0.4 |
| Polymerization initiator |  | IRGACURE 184 | 3.5 | 3.5 | 3.5 | 3.5 | 3.5 | 3.5 |
|  |  | LUCIRIN TPO | 9.5 | 9.5 | 9.5 | 9.5 | 9.5 | 9.5 |
|  |  | SPEEDCURE ITX | 3.2 | 3.2 | 3.2 | 3.2 | 3.2 | 3.2 |
| Surfactant |  | TEGORAD 2100 | — | — | — | — | — | — |
|  |  | FLUORAD FC430 | — | — | — | — | — | — |
| Component 1-B and component 1-D total content |  |  | 49 | 49 | 34 | 15 | 0 | 34 |
| Total |  |  | 100 | 100 | 100 | 100 | 100 | 100 |
| Performance evaluation results | Surface gloss |  | 4 | 2 | 3 | 1 | 1 | 2 |
|  | Image stripe unevenness |  | 3 | 2 | 2 | 1 | 1 | 2 |
|  | Curability |  | 3 | 2 | 3 | 2 | 3 | 2 |

TABLE 4-continued

|  | Ex. 1-1-1 Cyan | Comp. Ex. 1-1-1 Cyan | Comp. Ex. 1-1-2 Cyan | Comp. Ex. 1-1-3 Cyan | Comp. Ex. 1-1-4 Cyan | Comp. Ex. 1-1-5 Cyan |
|---|---|---|---|---|---|---|
| Flexibility | 3 | 3 | 3 | 2 | 2 | 2 |
| Substrate adhesion (PET substrate) | 5 | 2 | 3 | 4 | 3 | 2 |
| Substrate adhesion (acrylic resin substrate) | 5 | 1 | 3 | 4 | 3 | 1 |

TABLE 5

| | | | Ex. 1-1-1 Cyan | Comp. Ex. 1-1-6 Cyan | Comp. Ex. 1-1-7 Cyan | Comp. Ex. 1-1-8 Cyan | Comp. Ex. 1-1-9 Cyan | Comp. Ex. 1-1-10 Cyan | Comp. Ex. 1-1-11 Cyan |
|---|---|---|---|---|---|---|---|---|---|
| Pigment | | Cyan pigment | 2.46 | 2.46 | 2.46 | 2.46 | 2.46 | 2.46 | 2.46 |
| Dispersant | | SOLSPERSE 32000 | 0.82 | 0.82 | 0.82 | 0.82 | 0.82 | 0.82 | 0.82 |
| | | SOLSPERSE 36000 | — | — | — | — | — | — | — |
| Monomer | Component 1-A | N-Vinylcaprolactam | 14.5 | — | 14.5 | 14.5 | 14.5 | 14.5 | 14.5 |
| | Component 1-D | Isobornyl acrylate | 34 | — | 34 | 34 | 34 | 34 | 37.2 |
| | Component 1-B | CTFA | 15 | — | 15 | 15 | 15 | 15 | 15 |
| | Component 1-E | Isodecyl acrylate | 7.08 | 7.08 | 7.08 | 7.08 | 7.08 | 7.08 | 7.08 |
| | Other monomer | Phenoxyethyl acrylate | — | 63.5 | — | — | — | — | — |
| | | PO-modified NPGDA | 5.04 | 5.04 | 5.04 | 5.04 | 5.04 | 5.04 | 5.04 |
| Oligomer | | CN964 A85 | 4.5 | 4.5 | 4.45 | 4.4 | 4.45 | 4.4 | 4.5 |
| Polymerization inhibitor | | FIRSTCURE ST-1 (Al salt only) | 0.4 | 0.4 | 0.4 | 0.4 | 0.4 | 0.4 | 0.4 |
| Polymerization initiator | | IRGACURE 184 | 3.5 | 3.5 | 3.5 | 3.5 | 3.5 | 3.5 | 3.5 |
| | | LUCIRIN TPO | 9.5 | 9.5 | 9.5 | 9.5 | 9.5 | 9.5 | 9.5 |
| | | SPEEDCURE ITX | 3.2 | 3.2 | 3.2 | 3.2 | 3.2 | 3.2 | — |
| Surfactant | | TEGORAD 2100 | — | — | 0.05 | 0.1 | — | — | — |
| | | FLUORAD FC430 | — | — | — | — | 0.05 | 0.1 | — |
| Component 1-B and component 1-D total content | | | 49 | 0 | 49 | 49 | 49 | 49 | 52.2 |
| Total | | | 100 | 100 | 100 | 100 | 100 | 100 | 100 |
| Performance evaluation results | | Surface gloss | 4 | 1 | 2 | 1 | 1 | 1 | 3 |
| | | Image stripe unevenness | 3 | 1 | 1 | 1 | 1 | 2 | 2 |
| | | Curability | 3 | 2 | 2 | 2 | 2 | 2 | 3 |
| | | Flexibility | 3 | 1 | 3 | 3 | 3 | 1 | 3 |
| | | Substrate adhesion (PET substrate) | 5 | 2 | 2 | 2 | 2 | 5 | 3 |
| | | Substrate adhesion (acrylic resin substrate) | 5 | 1 | 1 | 1 | 1 | 5 | 2 |

The units for the numerical values of components used in Table 1 to Table 5 are parts by weight.

Furthermore, details of the abbreviations and symbols in Table 1 to Table 5 are as follows.

Cyan pigment: IRGALITE BLUE GLVO

Magenta pigment: CINQUASIA MAGENTA RT-355-D

Yellow pigment: NOVOPERM YELLOW H2G

Black pigment: SPECIAL BLACK 250

White pigment: TIPAQUE CR60-2

CTFA: cyclic trimethylolpropane formal acrylate

PO-modified NPGDA: propylene glycol-modified neopentyl glycol diacrylate

Examples 1-2-1 to 1-2-24 and Comparative Examples 1-2-1 to 1-2-3

First Embodiment of the Present Invention

Method for Preparation of Ink Composition

The materials described in Table 6 to Table 9 were mixed by stirring, thus giving ink compositions of Examples 1-2-1 to 1-2-24 and Comparative Examples 1-2-1 to 1-2-3. For the pigment addition, mill bases A to E above were used.

Inkjet Recording Method

An inkjet image was printed using an Acuity Advance UV-curing type inkjet printer (FUJIFILM Corporation). A 100% solid image was printed on coated paper (Oji Paper Co., Ltd.) at a resolution of 600×450 dpi with a size of 2 m×1 m.

A lamp was equipped with SUB ZERO 085 H bulb lamp units manufactured by Integration Technology, and front and rear lamp intensity was set at level 4.

When the exposure area illumination intensity was measured during printing it was found to be 630 mW/cm$^2$. Furthermore, the time from discharge until exposure was 0.15 to 0.4 sec. The amount discharged per drop was in the range of 6 to 42 pL.

Evaluation of Ink Composition

Images obtained using the ink compositions of Examples 1-2-1 to 1-2-24 and Comparative Examples 1-2-1 to 1-2-3 were evaluated by the evaluation methods below. The evaluation results are shown in Table 6 to Table 9.

Method for Measurement of Surface Tension of Each Ink Composition

The surface tension of the ink composition was measured at 25° C. using a SIGMA 702 surface tensiometer (suspended ring method, KSV Instruments Ltd.).

Evaluation of Surface Gloss

Measurement was carried out in accordance with ASTM D523 for an image obtained by the above-mentioned inkjet recording method by means of a surface gloss meter manufactured by Sheen Instruments Ltd. at a measurement angle of 60°. The evaluation criteria were as follows.
4: a surface gloss of at least 30
3: a surface gloss of at least 25 but less than 30
2: a surface gloss of at least 20 but less than 25
1: a surface gloss of less than 20

Evaluation of Image Stripe Unevenness

The stripe unevenness of an image obtained by the above-mentioned inkjet image recording method was evaluated by eye. The evaluation criteria were as follows.
4: stripe unevenness could not be seen even from a position 20 cm away from the image.
3: stripe unevenness could be seen from a position 20 cm away from the image, but could not be seen from a position 1 m away.
2: stripe unevenness could be seen from a position 1 m away from the image, but could not be seen from a position 2 m away
1: stripe unevenness could be seen from a position 2 m away.

Test of Antiblocking Properties 10 sheets having a size of 5 cm×10 cm were prepared by cutting the image obtained by the above-mentioned inkjet image recording method, they were superimposed on each other with printed faces upward, and allowed to stand at 25° C. for 24 hours with an iron weight of 2 kg having an area of 5 cm×10 cm placed thereon. The extent to which samples stuck to each other was evaluated using the criteria below.
4: there was no transfer of image at all.
3: there was no transfer of image, but there was slight resistance when separating papers.
2: only a small part of the image was transferred (image area less than 1%).
1: image was transferred (image area at least 1%).

Judging from the adequacy of the print image quality, the minimum level for practical use is 3 for the result of evaluation of surface gloss for the ink composition, and preferably 4.

Furthermore, with regard to the image stripe unevenness, it is preferable that there is as little as possible; the minimum allowable level for practical use is 2, preferably 3, and more preferably 4.

With regard to the antiblocking properties, when transfer of a printed material is visually apparent, the value of the printed material itself is lost, and a high level of performance is therefore required. The minimum allowable level for practical use is 3, and preferably 4.

TABLE 6

|  |  |  | Ex. 1-2-1 Cyan | Ex. 1-2-2 Magenta | Ex. 1-2-3 Yellow | Ex. 1-2-4 Black | Ex. 1-2-5 White |
|---|---|---|---|---|---|---|---|
| Pigment |  | Cyan pigment | 2.46 | — | — | — | — |
|  |  | Magenta pigment | — | 4.8 | — | — | — |
|  |  | Yellow pigment | — | — | 2.4 | — | — |
|  |  | Black pigment | — | — | — | 3.6 | — |
|  |  | White pigment | — | — | — | — | 15 |
| Dispersant |  | SOLSPERSE 32000 | 0.82 | 1.6 | 0.8 | 0.9 | — |
|  |  | SOLSPERSE 36000 | — | — | — | — | 1.8 |
| Monomer | Component 1-A | NVC | 10 | 10 | 10 | 10 | 10 |
|  | Component 1-D | IBOA | 5 | 5 | 5 | 5 | 5 |
|  | Component 1-B | CTFA | 53 | 48 | 53 | 51 | 42 |
|  | Other | PEA | — | — | — | — | — |
|  | monomer | TEGVE | 3.2 | 3.2 | 3.2 | 3.2 | 3.2 |
|  |  | PO-modified NPGDA | 4.82 | 5.7 | 4.9 | 5.6 | 4.5 |
|  |  | 3-MePDDA | 4 | 5 | 4 | 4 | 5 |
| Polymerization inhibitor |  | FIRSTCURE ST-1 | 0.5 | 0.5 | 0.5 | 0.5 | 0.5 |
| Polymerization initiator |  | IRGACURE 184 | 3.5 | 4.5 | 4.5 | 3.5 | 3.5 |
|  |  | LUCIRIN TPO | 9.5 | 8.5 | 8.5 | 9.5 | 8.5 |
|  |  | SPEEDCURE ITX | 3.2 | 3.2 | 3.2 | 3.2 | 1 |
| Component 1-A, 1-B, and 1-D total content (parts by weight) |  |  | 68 | 63 | 68 | 66 | 57 |
| Ink composition surface tension (mN/m) |  |  | 35.5 | 35.7 | 35.3 | 35.4 | 34.7 |
| Total (parts by weight) |  |  | 100.00 | 100.00 | 100.00 | 100.00 | 100.00 |
| Performance evaluation results |  | Surface gloss | 4 | 4 | 4 | 4 | 4 |
|  |  | Image stripe unevenness | 4 | 4 | 4 | 4 | 4 |
|  |  | Antiblocking properties | 4 | 4 | 4 | 4 | 4 |

TABLE 7

|  |  | Ex. 1-2-1 Cyan | Ex. 1-2-6 Cyan | Ex. 1-2-7 Cyan | Ex. 1-2-8 Cyan | Ex. 1-2-9 Cyan | Ex. 1-2-10 Cyan | Ex. 1-2-11 Cyan | Ex. 1-2-12 Cyan | Ex. 1-2-13 Cyan |
|---|---|---|---|---|---|---|---|---|---|---|
| Pigment | Cyan pigment | 2.46 | 2.46 | 2.46 | 2.46 | 2.46 | 2.46 | 2.46 | 2.46 | 2.46 |
| Dispersant | SOLSPERSE 32000 | 0.82 | 0.82 | 0.82 | 0.82 | 0.82 | 0.82 | 0.82 | 0.82 | 0.82 |
|  | SOLSPERSE 36000 | — | — | — | — | — | — | — | — | — |
| Monomer Component 1-A | NVC | 10 | 3 | 20 | 30 | 10 | 10 | 10 | 10 | 3 |
| Component 1-D | IBOA | 5 | 5 | 5 | 5 | 3 | 12.5 | 10 | 12.5 | 3.92 |
| Component 1-B | CTFA | 53 | 60 | 43 | 37 | 53 | 49.3 | 30 | 20 | 70 |
| Other monomer | PEA | — | — | — | — | — | — | 6.6 | 10.1 | — |
|  | TEGVE | 3.2 | 3.2 | 3.2 | 3.2 | 3.2 | 3.2 | 3.2 | 3.2 | — |
|  | PO-modified NPGDA | 4.82 | 4.82 | 4.82 | 0.82 | 8 | — | 15.22 | 19.22 | — |
|  | 3-MePDDA | 4 | 4 | 4 | 4 | 2.82 | 5.02 | 5 | 5 | 3.1 |
| Oligomer | CN964 A85 | — | — | — | — | — | — | — | — | — |
| Polymerization inhibitor | FIRSTCURE ST-1 | 0.5 | 0.5 | 0.5 | 0.5 | 0.5 | 0.5 | 0.5 | 0.5 | 0.5 |
| Polymerization initiator | IRGACURE 184 | 3.5 | 3.5 | 3.5 | 3.5 | 3.5 | 3.5 | 3.5 | 3.5 | 3.5 |
|  | LUCIRIN TPO | 9.5 | 9.5 | 9.5 | 9.5 | 9.5 | 9.5 | 9.5 | 9.5 | 9.5 |
|  | SPEEDCURE ITX | 3.2 | 3.2 | 3.2 | 3.2 | 3.2 | 3.2 | 3.2 | 3.2 | 3.2 |
| Components 1-A, 1-B, and 1-D total content (parts by weight) |  | 68 | 68 | 68 | 72 | 66 | 71.8 | 50 | 42.5 | 76.92 |
| Ink composition surface tension (mN/m) |  | 35.5 | 35.3 | 35.8 | 36.5 | 35.2 | 33.9 | 35.7 | 36.2 | 34.8 |
| Total (parts by weight) |  | 100.00 | 100.00 | 100.00 | 100.00 | 100.00 | 100.00 | 100.00 | 100.00 | 100.00 |
| Performance evaluation results | Surface gloss | 4 | 4 | 4 | 3 | 4 | 4 | 4 | 3 | 3 |
|  | Image stripe unevenness | 4 | 4 | 4 | 4 | 4 | 4 | 4 | 4 | 3 |
|  | Antiblocking properties | 4 | 4 | 4 | 4 | 4 | 3 | 4 | 4 | 3 |

TABLE 8

|  |  | Ex. 1-2-1 Cyan | Ex. 1-2-14 Cyan | Ex. 1-2-15 Cyan | Ex. 1-2-16 Cyan | Ex. 1-2-17 Cyan | Ex. 1-2-18 Cyan |
|---|---|---|---|---|---|---|---|
| Pigment | Cyan pigment | 2.46 | 2.46 | 2.46 | 2.46 | 2.46 | 2.46 |
| Dispersant | SOLSPERSE 32000 | 0.82 | 0.82 | 0.82 | 0.82 | 0.82 | 0.82 |
|  | SOLSPERSE 36000 | — | — | — | — | — | — |
| Monomer Component 1-A | NVC | 10 | 10 | 10 | 10 | 14 | 20 |
| Component 1-D | IBOA | 5 | 5 | 5 | 5 | 3 | 1 |
| Component 1-B | CTFA | 53 | 53 | 53 | 53 | 43 | 36 |
| Other monomer | PEA | — | — | — | — | 12 | 15 |
|  | TEGVE | 3.2 | 3.2 | 3.2 | 3.2 | 3.2 | 3.2 |
|  | PO-modified NPGDA | 4.82 | 2.8 | 1.82 | 4.81 | 4.82 | 4.82 |
|  | 3-MePDDA | 4 | 2.02 | — | 4 | — | — |
| Oligomer | CN964 A85 | — | 4 | 7 | — | — | — |
| Polymerization inhibitor | FIRSTCURE ST-1 | 0.5 | 0.5 | 0.5 | 0.5 | 0.5 | 0.5 |
| Polymerization initiator | IRGACURE 184 | 3.5 | 3.5 | 3.5 | 3.5 | 3.5 | 3.5 |
|  | LUCIRIN TPO | 9.5 | 9.5 | 9.5 | 9.5 | 9.5 | 9.5 |
|  | IRGACURE 819 | — | — | — | — | — | — |
|  | SPEEDCURE ITX | 3.2 | 3.2 | 3.2 | 3.2 | 3.2 | 3.2 |
|  | I-14 | — | — | — | — | — | — |
| Surfactant | TEGORAD 2100 | — | — | — | 0.01 | — | — |
| Component 1-A, 1-B, and 1-D total content (parts by weight) |  | 68 | 68 | 68 | 68 | 60 | 57 |
| Ink composition surface tension (mN/m) |  | 35.5 | 35.7 | 36.3 | 31.2 | 37 | 37.5 |
| Total (parts by weight) |  | 100.00 | 100.00 | 100.00 | 100.00 | 100.00 | 100.00 |
| Performance evaluation results | Surface gloss | 4 | 4 | 3 | 3 | 3 | 3 |
|  | Image stripe unevenness | 4 | 3 | 3 | 3 | 3 | 2 |
|  | Antiblocking properties | 4 | 4 | 4 | 4 | 4 | 4 |

TABLE 8-continued

|  |  |  | Ex. 1-2-19 Cyan | Ex. 1-2-20 Cyan | Ex. 1-2-21 Cyan | Ex. 1-2-22 Cyan | Ex. 1-2-23 Cyan | Ex. 1-2-24 Cyan |
|---|---|---|---|---|---|---|---|---|
|  | Pigment | Cyan pigment | 2.46 | 2.46 | 2.46 | 2.46 | 2.46 | 2.46 |
|  | Dispersant | SOLSPERSE 32000 | 0.82 | 0.82 | 0.82 | 0.82 | 0.82 | 0.82 |
|  |  | SOLSPERSE 36000 | — | — | — | — | — | — |
| Monomer | Component 1-A | NVC | 10 | 10 | 10 | 10 | 12 | 10 |
|  | Component 1-D | IBOA | 5 | 5 | 5 | 5 | — | 25 |
|  | Component 1-B | CTFA | 56.4 | 51.2 | 56.2 | 51.2 | 60 | 33 |
|  | Other monomer | PEA | — | — | — | — | — | — |
|  |  | TEGVE | 3.2 | 3.2 | 3.2 | 3.2 | 3.2 | 3.2 |
|  |  | PO-modified NPGDA | 4.82 | 4.82 | 4.82 | 4.82 | 4.82 | 4.82 |
|  |  | 3-MePDDA | 4 | 4 | 4 | 4 | — | 4 |
|  | Oligomer | CN964 A85 | — | — | — | — | — | — |
|  | Polymerization inhibitor | FIRSTCURE ST-1 | 0.5 | 0.5 | 0.5 | 0.5 | 0.5 | 0.5 |
|  | Polymerization initiator | IRGACURE 184 | 3.5 | 3.5 | 3.5 | 3.5 | 3.5 | 3.5 |
|  |  | LUCIRIN TPO | 4.8 | 9.5 | 9.5 | 9.5 | 9.5 | 9.5 |
|  |  | IRGACURE 819 | 4.5 | — | — | — | — | — |
|  |  | SPEEDCURE ITX | — | — | — | — | 3.2 | 3.2 |
|  |  | I-14 | — | 5 | — | 5 | — | — |
|  | Surfactant | TEGORAD 2100 | — | — | — | — | — | — |
| Component 1-A, 1-B, and 1-D total content (parts by weight) |  |  | 71.4 | 66.2 | 71.2 | 66.2 | 72 | 68 |
| Ink composition surface tension (mN/m) |  |  | 35.5 | 35.5 | 35.5 | 35.5 | 37.5 | 33.8 |
| Total (parts by weight) |  |  | 100.00 | 100.00 | 100.00 | 100.00 | 100.00 | 100.00 |
| Performance evaluation results | Surface gloss |  | 4 | 4 | 4 | 4 | 3 | 4 |
|  | Image stripe unevenness |  | 4 | 4 | 3 | 4 | 3 | 4 |
|  | Antiblocking properties |  | 4 | 4 | 3 | 4 | 4 | 2 |

TABLE 9

|  |  | Ex. 1-2-1 Cyan | Comp. Ex. 1-2-1 Cyan | Comp. Ex. 1-2-2 Cyan | Comp. Ex. 1-2-3 Cyan |
|---|---|---|---|---|---|
| Pigment | Cyan pigment | 2.46 | 2.46 | 2.46 | 2.46 |
| Dispersant | SOLSPERSE 32000 | 0.82 | 0.82 | 0.82 | 0.82 |
|  | SOLSPERSE 36000 | — | — | — | — |
| Monomer Component 1-A | NVC | 10 | — | 10 | 16 |
| Component 1-D | IBOA | 5 | 5 | 5 | 54 |
| Component 1-B | CTFA | 53 | 63 | — | 3.2 |
| Other monomer | PEA | — | — | 53 | — |
|  | TEGVE | 3.2 | 3.2 | 3.2 | — |
|  | PO-modified NPGDA | 4.82 | 4.82 | 4.82 | 6.72 |
|  | 3-MePDDA | 4 | 4 | 4 | — |
| Polymerization inhibitor | FIRSTCURE ST-1 | 0.5 | 0.5 | 0.5 | 0.5 |
| Polymerization initiator | IRGACURE 184 | 3.5 | 3.5 | 3.5 | 3.5 |
|  | LUCIRIN TPO |  | 9.5 | 9.5 | 9.5 |
|  | SPEEDCURE ITX |  | 3.2 | 3.2 | 3.2 |
| Surfactant | TEGORAD 2100 | — | — | — | 0.1 |
| Component 1-A, 1-B, and 1-D total content (parts by weight) |  | 68 | 68 | 15 | 73.2 |
| Ink composition surface tension (mN/m) |  | 35.5 | 35.1 | 38.5 | 30.2 |
| Total (parts by weight) |  | 100.00 | 100.00 | 100.00 | 100.00 |
| Performance evaluation results | Surface gloss | 4 | 3 | 1 | 1 |
|  | Image stripe unevenness | 4 | 2 | 2 | 2 |
|  | Antiblocking properties | 4 | 1 | 4 | 4 |

The units for the numerical values of components used in Table 6 to Table 9 are parts by weight.

Furthermore, details of the abbreviations and symbols in Table 6 to Table 9 are as follows.

Cyan pigment: IRGALITE BLUE GLVO
Magenta pigment: CINQUASIA MAGENTA RT-355-D
Yellow pigment: NOVOPERM YELLOW H2G
Black pigment: SPECIAL BLACK 250
White pigment: TIPAQUE CR60-2
NVC: N-vinylcaprolactam
IBOA: isobornyl acrylate
CTFA: cyclic trimethylolpropane formal acrylate
PEA: phenoxyethyl acrylate
TEGVE: triethylene glycol divinyl ether
PO-modified NPGDA: propylene oxide-modified neopentyl glycol diacrylate
3-MePDDA: 3-methyl-1,5-pentanediol diacrylate Preparation of Cyan Mill Base A'

300 parts by weight of IRGALITE BLUE GLVO, 620 parts by weight of SR341, and 80 parts by weight of SOLSPERSE 32000 were mixed by stirring, thus giving cyan mill base A'. Preparation of cyan mill base A' was carried out by dispersing using a Motor Mill M50 disperser (Eiger Machinery, Inc.) with zirconia beads having a diameter of 0.65 mm at a peripheral speed of 9 m/s for 4 hours.

Preparation of Magenta Mill Base B'

300 parts by weight of CINQUASIA MAGENTA RT-355-D, 600 parts by weight of SR341, and 100 parts by weight of SOLSPERSE 32000 were mixed by stirring, thus giving magenta mill base B'. Preparation of magenta mill base B' was carried out by dispersing using a Motor Mill M50 disperser (Eiger Machinery, Inc.) with zirconia beads having a diameter of 0.65 mm at a peripheral speed of 9 m/s for 10 hours.

Preparation of Yellow Mill Base C'

300 parts by weight of NOVOPERM YELLOW H2G, 600 parts by weight of SR341, and 100 parts by weight of SOLSPERSE 32000 were mixed by stirring, thus giving yellow mill base C'. Preparation of yellow mill base C' was carried out by dispersing using a Motor Mill M50 disperser (Eiger Machinery, Inc.) with zirconia beads having a diameter of 0.65 mm at a peripheral speed of 9 m/s for 10 hours.

Preparation of Black Mill Base D'

400 parts by weight of SPECIAL BLACK 250, 520 parts by weight of SR341, and 80 parts by weight of SOLSPERSE 32000 were mixed by stirring, thus giving black mill base D'. Preparation of black mill base D' was carried out by dispersing using a Motor Mill M50 disperser (Eiger Machinery, Inc.) with zirconia beads having a diameter of 0.65 mm at a peripheral speed of 9 m/s for 7 hours.

Preparation of White Mill Base E'

500 parts by weight of TIPAQUE CR60-2, 440 parts by weight of SR341, and 60 parts by weight of SOLSPERSE 41000 were mixed by stirring, thus giving white mill base E'. Preparation of white mill base E' was carried out by dispersing using a Motor Mill M50 disperser (Eiger Machinery, Inc.) with zirconia beads having a diameter of 0.65 mm at a peripheral speed of 9 m/s for 4 hours.

Examples 2-1 to 2-26 and Comparative Examples 2-1 to 2-10

Second Embodiment of the Present Invention

Method for Preparation of Ink Composition

The materials described in Table 10 to Table 14 were mixed by stirring, thus giving ink compositions of Examples 2-1 to 2-26 and Comparative Examples 2-1 to 2-10. For the pigment addition, mill bases A' to E' above were used.

Method for Measurement of Surface Tension

The surface tension of the ink composition was measured at 25° C. using a SIGMA 702 surface tensiometer (suspended ring method, KSV Instruments Ltd.).

Inkjet Recording Method

An inkjet image was printed in bidirectional print mode and Fineart mode using an Acuity Advance UV curing type inkjet printer (FUJIFILM Corporation). Fineart mode is printing carried out in multipass mode in which the same image area is drawn with 8 passes. The printer was equipped with UV lamp light sources at left and right positions of the head unit, and in bidirectional print mode the same image area is exposed to UV 16 times during drawing 8 times with the multiple passes.

A 100% solid image was printed on OK Topcoat (coated paper, Oji Paper Co., Ltd.) at a resolution of 600×450 dpi with a size of 30 cm×30 cm. The lamp was equipped with SUB ZERO 085 H bulb lamp units manufactured by Integration Technology, and front and rear lamp intensity was set at level 5.

When the exposure area illumination intensity was measured during printing it was found to be 745 mW/cm$^2$.

Evaluation of Surface Gloss

Measurement was carried out for an image obtained by the above-mentioned inkjet recording method using a surface gloss meter manufactured by Sheen Instruments Ltd. at a measurement angle of 60°. The evaluation criteria were as follows.

4: a surface gloss of at least 40
3: a surface gloss of at least 30 but less than 40
2: a surface gloss of at least 20 but less than 30
1: a surface gloss of less than 20

Evaluation of Image Stripe Unevenness

The stripe unevenness of an image obtained by the above-mentioned inkjet image recording method was evaluated by eye from a position 2 m away from the image. The evaluation criteria were as follows.

3: stripe unevenness could not be clearly seen by eye.
2: slight stripe unevenness could be seen by eye.
1: stripe unevenness could be clearly seen by eye.

Evaluation of Curability

The degree of tackiness of an image obtained by the above-mentioned inkjet recording method was evaluated by touch using the criteria below.

3: there was no tackiness on the image.
2: the image was slightly tacky, but uncured ink composition or cured film did not transfer to the hand.
1: the image was tacky, and some uncured ink composition or cured film transferred to the hand.

Evaluation of Flexibility: Bending Test

In the present embodiment, as a method for evaluating the flexibility of a cured film, a bending test was carried out.

100% and 200% solid images were formed by the above-mentioned inkjet recording method and evaluation was carried out using the criteria below.

3: no cracks occurred for 100% and 200% samples.
2: no cracks occurred for the 100% sample, but cracks occurred in the bent part of an image area for the 200% average film thickness sample.
1: cracks occurred in the bent part of an image area for both 100% and 200% average film thickness samples.

TABLE 10

|  |  | Ex. 2-1 Cyan | Ex. 2-2 Magenta | Ex. 2-3 Yellow | Ex. 2-4 Black | Ex. 2-5 White |
|---|---|---|---|---|---|---|
| Pigment | Cyan pigment | 2.46 | — | — | — | — |
|  | Magenta pigment | — | 4.8 | — | — | — |
|  | Yellow pigment | — | — | 3.75 | — | — |
|  | Black pigment | — | — | — | 3.6 | — |
|  | White pigment | — | — | — | — | 15 |
| Dispersant | SOLSPERSE 32000 | 0.82 | 1.6 | 1.25 | 0.9 | — |
|  | SOLSPERSE 36000 | — | — | — | — | 1.8 |
| Monomer Component 2-A | 3-Methylpentanediol diacrylate | 16 | 18 | 14 | 14 | 20 |
| Component 2-B | CTFA | 54 | 52 | 54 | 54 | 46.5 |
| Other monomer | Triethylene glycol divinyl ether | 3.2 | 3.2 | 3.2 | 3.2 | 3.2 |
|  | Isodecyl acrylate | 6.82 | 3.7 | 7.1 | 7.6 | — |
| Polymerization inhibitor | FIRSTCURE ST-1 | 0.5 | 0.5 | 0.5 | 0.5 | 0.5 |
| Polymerization initiator | IRGACURE 184 | 3.5 | 4.5 | 4.5 | 3.5 | 3.5 |
|  | LUCIRIN TPO | 9.5 | 8.5 | 8.5 | 9.5 | 8.5 |
|  | SPEEDCURE ITX | 3.2 | 3.2 | 3.2 | 3.2 | 1.0 |
| Component 2-A and Component 2-B total content |  | 70 | 70 | 68 | 68 | 66.5 |
| Ink composition surface tension (mN/m) |  | 34.8 | 35.1 | 35.0 | 34.9 | 35.2 |
| Total (parts by weight) |  | 100 | 100 | 100 | 100 | 100 |
| Performance evaluation results | Surface gloss | 4 | 4 | 4 | 4 | 4 |
|  | Image stripe unevenness | 3 | 3 | 3 | 3 | 3 |
|  | Curability | 3 | 3 | 3 | 3 | 3 |
|  | Flexibility | 3 | 3 | 3 | 3 | 3 |

TABLE 11

|  |  | Ex. 2-1 Cyan | Ex. 2-6 Cyan | Ex. 2-7 Cyan | Ex. 2-8 Cyan | Ex. 2-9 Cyan | Ex. 2-10 Cyan | Ex. 2-11 Cyan | Ex. 2-12 Cyan | Ex. 2-13 Cyan | Ex. 2-14 Cyan |
|---|---|---|---|---|---|---|---|---|---|---|---|
| Pigment | Cyan pigment | 2.46 | 2.46 | 2.46 | 2.46 | 2.46 | 2.46 | 2.46 | 2.46 | 2.46 | 2.46 |
| Dispersant | SOLSPERSE 32000 | 0.82 | 0.82 | 0.82 | 0.82 | 0.82 | 0.82 | 0.82 | 0.82 | 0.82 | 0.82 |
|  | SOLSPERSE 36000 | — | — | — | — | — | — | — | — | — | — |
| Monomer Component 2-A | 3-Methylpentanediol diacrylate | 16 | 18 | 18 | 18 | 14 | 8 | 3 | 5 | 20 | 35 |
| Component 2-B | CTFA | 54 | 36 | 41 | 50 | 60 | 69 | 60 | 60 | 54.8 | 39.8 |
| Other monomer | Triethylene glycol divinyl ether | 3.2 | 10.5 | 8.2 | 6.5 | 3.2 | 3.02 | 10.6 | 8.6 | 3.2 | 3.2 |
|  | Isodecyl acrylate | 6.82 | 15.5 | 12.8 | 5.52 | 2.82 | — | 6.42 | 6.42 | — | — |
| Oligomer | CN964 A85 | — | — | — | — | — | — | — | — | 2.02 | 2.02 |
| Polymerization inhibitor | FIRSTCURE ST-1 | 0.5 | 0.5 | 0.5 | 0.5 | 0.5 | 0.5 | 0.5 | 0.5 | 0.5 | 0.5 |
| Polymerization initiator | IRGACURE 184 | 3.5 | 3.5 | 3.5 | 3.5 | 3.5 | 3.5 | 3.5 | 3.5 | 3.5 | 3.5 |
|  | LUCIRIN TPO | 9.5 | 9.5 | 9.5 | 9.5 | 9.5 | 9.5 | 9.5 | 9.5 | 9.5 | 9.5 |
|  | SPEEDCURE ITX | 3.2 | 3.2 | 3.2 | 3.2 | 3.2 | 3.2 | 3.2 | 3.2 | 3.2 | 3.2 |
| Component 2-A and Component 2-B total content |  | 70 | 54 | 59 | 68 | 74 | 77 | 63 | 65 | 74.8 | 74.8 |
| Ink composition surface tension (mN/m) |  | 34.8 | 33.5 | 34.0 | 35.0 | 34.6 | 34.4 | 34.9 | 34.9 | 34.5 | 34.2 |
| Total (parts by weight) |  | 100 | 100 | 100 | 100 | 100 | 100 | 100 | 100 | 100 | 100 |
| Performance evaluation results | Surface gloss | 4 | 3 | 3 | 4 | 4 | 3 | 3 | 4 | 4 | 4 |
|  | Image stripe unevenness | 3 | 2 | 3 | 3 | 3 | 3 | 3 | 3 | 3 | 3 |
|  | Curability | 3 | 3 | 3 | 3 | 3 | 3 | 3 | 3 | 3 | 3 |
|  | Flexibility | 3 | 3 | 3 | 2 | 3 | 3 | 3 | 3 | 3 | 2 |

TABLE 12

|  |  | Ex. 2-1 Cyan | Ex. 2-15 Cyan | Ex. 2-16 Cyan | Ex. 2-17 Cyan | Ex. 2-18 Cyan | Ex. 2-19 Cyan | Ex. 2-20 Cyan |
|---|---|---|---|---|---|---|---|---|
| Pigment | Cyan pigment | 2.46 | 2.46 | 2.46 | 2.46 | 2.46 | 2.46 | 2.46 |
| Dispersant | SOLSPERSE 32000 | 0.82 | 0.82 | 0.82 | 0.82 | 0.82 | 0.82 | 0.82 |
|  | SOLSPERSE 36000 | — | — | — | — | — | — | — |
| Monomer Component 2-A | 3-Methylpentanediol diacrylate | 16 | 14 | 10 | 10 | 10 | 10 | 8 |

TABLE 12-continued

|  |  | Ex. 2-1 Cyan | Ex. 2-15 Cyan | Ex. 2-16 Cyan | Ex. 2-17 Cyan | Ex. 2-18 Cyan | Ex. 2-19 Cyan | Ex. 2-20 Cyan |
|---|---|---|---|---|---|---|---|---|
|  | Neopentyl glycol diacrylate | — | — | — | — | — | — | — |
|  | Hexanediol diacrylate | — | — | — | — | — | — | — |
|  | Nonanediol diacrylate | — | — | — | — | — | — | — |
|  | Decanediol diacrylate | — | — | — | — | — | — | — |
| Component 2-B | CTFA | 54 | 50 | 51 | 46 | 43 | 46 | 60 |
| Other monomer | Triethylene glycol divinyl ether | 3.2 | 3.2 | 3.2 | 3.2 | 3.2 | 3.2 | 3.2 |
|  | N-Vinylcaprolactam | — | 10 | 15 | 15 | 15 | — | — |
|  | Phenoxyethyl acrylate | — | — | — | 5.82 | 8.82 | — | — |
|  | Isodecyl acrylate | 6.82 | 2.82 | 0.82 | — | — | 20.82 | 8.81 |
| Oligomer | CN964 A85 | — | — | — | — | — | — | — |
| Polymerization inhibitor | FIRSTCURE ST-1 | 0.5 | 0.5 | 0.5 | 0.5 | 0.5 | 0.5 | 0.5 |
| Polymerization initiator | IRGACURE 184 | 3.5 | 3.5 | 3.5 | 3.5 | 3.5 | 3.5 | 3.5 |
|  | LUCIRIN TPO | 9.5 | 9.5 | 9.5 | 9.5 | 9.5 | 9.5 | 9.5 |
|  | SPEEDCURE ITX | 3.2 | 3.2 | 3.2 | 3.2 | 3.2 | 3.2 | 3.2 |
| Surfactant | TEGORAD 2100 | — | — | — | — | — | — | 0.01 |
| Component 2-A and Component 2-B total content |  | 70 | 64 | 61 | 56 | 53 | 56 | 68 |
| Ink composition surface tension (mN/m) |  | 34.8 | 35.9 | 36.5 | 37.0 | 37.5 | 33.1 | 33.1 |
| Total (parts by weight) |  | 100 | 100 | 100 | 100 | 100 | 100 | 100 |
| Performance evaluation results | Surface gloss | 4 | 4 | 4 | 3 | 3 | 3 | 3 |
|  | Image stripe unevenness | 3 | 3 | 3 | 3 | 2 | 2 | 2 |
|  | Curability | 3 | 3 | 3 | 3 | 3 | 3 | 3 |
|  | Flexibility | 3 | 3 | 3 | 3 | 3 | 3 | 3 |

TABLE 13

|  |  | Ex. 2-1 Cyan | Ex. 2-21 Cyan | Ex. 2-22 Cyan | Ex. 2-23 Cyan | Ex. 2-24 Cyan | Ex. 2-25 Cyan | Ex. 2-26 Cyan |
|---|---|---|---|---|---|---|---|---|
| Pigment | Cyan pigment | 2.46 | 2.46 | 2.46 | 2.46 | 2.46 | 2.46 | 2.46 |
| Dispersant | SOLSPERSE 32000 | 0.82 | 0.82 | 0.82 | 0.82 | 0.82 | 0.82 | 0.82 |
|  | SOLSPERSE 36000 | — | — | — | — | — | — | — |
| Monomer Component 2-A | 3-Methylpentanediol diacrylate | 16 | 8 | 20 | — | — | — | — |
|  | Neopentyl glycol diacrylate | — | — | — | 16 | — | — | — |
|  | Hexanediol diacrylate | — | — | — | — | 16 | — | — |
|  | Nonanediol diacrylate | — | — | — | — | — | 16 | — |
|  | Decanediol diacrylate | — | — | — | — | — | — | 16 |
| Component 2-B | CTFA | 54 | 43 | 68 | 54 | 54 | 54 | 54 |
| Other monomer | Triethylene glycol divinyl ether | 3.2 | 3.02 | — | 3.2 | 3.2 | 3.2 | 3.2 |
|  | N-Vinylcaprolactam | — | — | — | — | — | — | — |
|  | Phenoxyethyl acrylate | — | — | — | — | — | — | — |
|  | Isodecyl acrylate | 6.82 | 26 | — | 6.82 | 6.82 | 6.82 | 6.82 |
| Oligomer | CN964 A85 | — | — | — | — | — | — | — |
| Polymerization inhibitor | FIRSTCURE ST-1 | 0.5 | 0.5 | 0.5 | 0.5 | 0.5 | 0.5 | 0.5 |
| Polymerization initiator | IRGACURE 184 | 3.5 | 3.5 | 1.72 | 3.5 | 3.5 | 3.5 | 3.5 |
|  | LUCIRIN TPO | 9.5 | 9.5 | 5.5 | 9.5 | 9.5 | 9.5 | 9.5 |
|  | SPEEDCURE ITX | 3.2 | 3.2 | 1.0 | 3.2 | 3.2 | 3.2 | 3.2 |
| Surfactant | TEGORAD 2100 | — | — | — | — | — | — | — |
| Component 2-A and Component 2-B total content |  | 70 | 51 | 88 | 70 | 70 | 70 | 70 |
| Ink composition surface tension (mN/m) |  | 34.8 | 34.5 | 34.0 | 34.6 | 34.5 | 34.5 | 34.3 |
| Total (parts by weight) |  | 100 | 100 | 100 | 100 | 100 | 100 | 100 |
| Performance | Surface gloss | 4 | 3 | 3 | 4 | 3 | 3 | 3 |

TABLE 13-continued

|  |  | Ex. 2-1 Cyan | Ex. 2-21 Cyan | Ex. 2-22 Cyan | Ex. 2-23 Cyan | Ex. 2-24 Cyan | Ex. 2-25 Cyan | Ex. 2-26 Cyan |
|---|---|---|---|---|---|---|---|---|
| evaluation results | Image stripe unevenness | 3 | 2 | 3 | 3 | 3 | 3 | 3 |
|  | Curability | 3 | 3 | 2 | 3 | 3 | 3 | 2 |
|  | Flexibility | 3 | 3 | 3 | 3 | 3 | 3 | 3 |

TABLE 14

|  |  |  | Ex. 2-1 Cyan | Comp. Ex. 2-1 Cyan | Comp. Ex. 2-2 Cyan | Comp. Ex. 2-3 Cyan | Comp. Ex. 2-4 Cyan | Comp. Ex. 2-5 Cyan | Comp. Ex. 2-6 Cyan | Comp. Ex. 2-7 Cyan | Comp. Ex. 2-8 Cyan | Comp. Ex. 2-9 Cyan | Comp. Ex. 2-10 Cyan |
|---|---|---|---|---|---|---|---|---|---|---|---|---|---|
| Pigment |  | Cyan pigment | 2.46 | 2.46 | 2.46 | 2.46 | 2.46 | 2.46 | 2.46 | 2.46 | 2.46 | 2.46 | 2.46 |
| Dispersant |  | SOLSPERSE 32000 | 0.82 | 0.82 | 0.82 | 0.82 | 0.82 | 0.82 | 0.82 | 0.82 | 0.82 | 0.82 | 0.82 |
|  |  | SOLSPERSE 36000 | — | — | — | — | — | — | — | — | — | — | — |
| Monomer | Component 2-A | 3-Methyl-pentanediol diacrylate | 16 | 16 | — | 14 | 2.02 | 42 | 8 | 24 | 16 | 10 | 10 |
|  | Component 2-B | CTFA | 54 | — | 54 | 28 | 78 | 28 | 18 | 68 | 54 | 36.82 | 39.82 |
|  | Other monomer | Triethylene glycol divinyl ether | 3.2 | 3.2 | 3.2 | 3.2 | — | 3.2 | 3.2 | — | 3.2 | 3.2 | 3.2 |
|  |  | N-Vinylcaprolactam | — | — | — | — | — | — | — | — | — | — | 7 |
|  |  | Isodecyl acrylate | 6.82 | 6.82 | 6.82 | 6.82 | — | 6.82 | — | — | 6.72 | 30 | — |
|  |  | Phenoxyethyl acrylate | — | — | — | — | — | — | — | — | — | — | 20 |
|  |  | PO modified NPGDA | — | 54 | 16 | 28 | — | — | 50.82 | — | — | — | — |
| Polymerization inhibitor |  | FIRSTCURE ST-1 | 0.5 | 0.5 | 0.5 | 0.5 | 0.5 | 0.5 | 0.5 | 0.5 | 0.5 | 0.5 | 0.5 |
| Polymerization initiator |  | IRGACURE 184 | 3.5 | 3.5 | 3.5 | 3.5 | 3.5 | 3.5 | 3.5 | 1.0 | 3.5 | 3.5 | 3.5 |
|  |  | LUCIRIN TPO | 9.5 | 9.5 | 9.5 | 9.5 | 9.5 | 9.5 | 9.5 | 2.22 | 9.5 | 9.5 | 9.5 |
|  |  | SPEEDCURE ITX | 3.2 | 3.2 | 3.2 | 3.2 | 3.2 | 3.2 | 3.2 | 1.0 | 3.2 | 3.2 | 3.2 |
| Surfactant |  | TEGORAD 2100 | — | — | — | — | — | — | — | — | 0.1 | — | — |
| Component 2-A and Component 2-B total content |  |  | 70 | 16 | 54 | 42 | 80 | 70 | 26 | 92 | 70 | 46.82 | 49.82 |
| Ink composition surface tension (mN/m) |  |  | 34.8 | 34.0 | 35.4 | 34.8 | 35.2 | 35.2 | 35.6 | 34.9 | 28.5 | 32.7 | 38.1 |
| Total (parts by weight) |  |  | 100 | 100 | 100 | 100 | 100 | 100 | 100 | 100 | 100 | 100 | 100 |
| Performance evaluation results | Surface gloss |  | 4 | 2 | 2 | 2 | 2 | 3 | 1 | 2 | 1 | 2 | 2 |
|  | Image stripe unevenness |  | 3 | 1 | 2 | 2 | 2 | 3 | 2 | 1 | 3 | 2 | 2 |
|  | Curability |  | 3 | 3 | 3 | 3 | 3 | 3 | 3 | 1 | 3 | 2 | 3 |
|  | Flexibility |  | 3 | 1 | 3 | 3 | 3 | 1 | 1 | 3 | 3 | 3 | 3 |

The units for the numerical values of components used in Table 10 to Table 14 are parts by weight.

Furthermore, details of the abbreviations and symbols in Table 10 to Table 14 are as follows.

Cyan pigment: IRGALITE BLUE GLVO
Magenta pigment: CINQUASIA MAGENTA RT-355-D
Yellow pigment: NOVOPERM YELLOW H2G
Black pigment: SPECIAL BLACK 250
White pigment: TIPAQUE CR60-2
CTFA: cyclic trimethylolpropane formal acrylate
PO-modified NPGDA: propylene glycol-modified neopentyl glycol diacrylate

What is claimed is:

1. An inkjet ink composition comprising:
(Component 1-A) an N-vinyllactam;
(Component 1-B) a compound represented by Formula (1); and
(Component 1-C) at least one compound selected from the group consisting of a bisacylphosphine compound, a thioxanthone compound, a thiochromanone compound, and an α-aminoketone compound;
the inkjet ink composition either not comprising a silicone-based surfactant or a fluorine-based surfactant or comprising a silicone-based surfactant and a fluorine-based surfactant at a total content of greater than 0 wt % but no greater than 0.005 wt % relative to the entire weight of the inkjet ink composition,

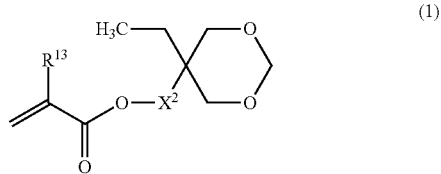

wherein $R^{13}$ denotes a hydrogen atom or a methyl group, and $X^2$ denotes a single bond or a divalent linking group.

2. The inkjet ink composition according to claim 1, wherein the inkjet ink composition further comprises (Component 1-D) a compound represented by Formula (2),

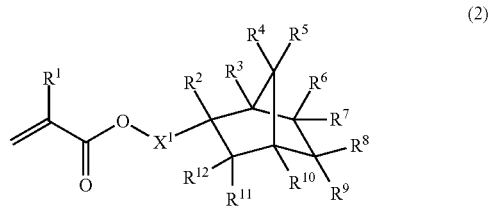

wherein $R^1$ denotes a hydrogen atom or a methyl group, $X^1$ denotes a single bond or a divalent linking group, and $R^2$ to $R^{12}$ independently denote a hydrogen atom or an alkyl group.

3. The inkjet ink composition according to claim 2, wherein Component 1-D is isobornyl (meth)acrylate.

4. The inkjet ink composition according to claim 2, wherein the inkjet ink composition has a content of Component 1-D of at least 13 wt % but no greater than 55 wt % relative to the entire weight of the inkjet ink composition.

5. The inkjet ink composition according to claim 2, wherein the inkjet ink composition has a content of Component 1-D of at least 1 wt % but less than 13 wt % relative to the entire weight of the inkjet ink composition.

6. The inkjet ink composition according to claim 1, wherein the inkjet ink composition further comprises (Component 1-E) a (meth)acrylate compound having a chain-form hydrocarbon group having 8 to 13 carbons.

7. The inkjet ink composition according to claim 1, wherein Component 1-B is cyclic trimethylolpropane formal (meth)acrylate.

8. The inkjet ink composition according to claim 1, wherein the inkjet ink composition has a content of Component 1-A of 3 to 35 wt % relative to the entire weight of the inkjet ink composition.

9. The inkjet ink composition according to claim 1, wherein the inkjet ink composition further comprises (Component 1-F) an oligomer.

10. The ink composition according to claim 1, wherein the inkjet ink composition has a content of polyfunctional (meth)acrylate compound of 3 to 25 wt % relative to the entire weight of the inkjet ink composition.

11. An inkjet recording method comprising:
($a^1$) a step pf discharging the inkjet ink composition according to claim 1 onto a recording medium; and
($b^1$) a step of curing the inkjet ink composition by irradiating the discharged inkjet ink composition with actinic radiation.

12. A printed material formed using the inkjet recording method according to claim 11.

13. The inkjet ink composition according to claim 1, wherein the inkjet ink composition further comprises a urethane (meth)acrylate.

14. An inkjet ink composition comprising:
(Component 2-A) the di(meth)acrylate of a hydrocarbon diol having 5 to 10 carbons at 3 to 35 wt %;
(Component 2-B) a compound represented by Formula (1) at 35 to 70 wt %; and
(Component 2-C) a polymerization initiator;
the inkjet ink composition having a total content of Component 2-A and Component 2-B of 50 to 90 wt %,
a surface tension at 25° C. of 33 to 37.5 mN/m, and
the inkjet ink composition either not comprising a silicone-based surfactant or a fluorine-based surfactant or comprising a silicone-based surfactant and a fluorine-based surfactant at a total content of greater than 0 wt % but no greater than 0.005 wt % relative to the entire weight of the inkjet ink composition,

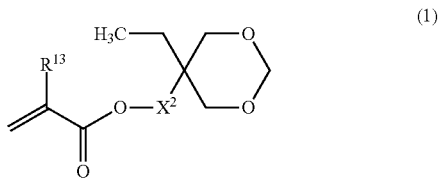

wherein $R^{13}$ denotes a hydrogen atom or a methyl group, and $X^2$ denotes a single bond or a divalent linking group.

15. The inkjet ink composition according to claim 14, wherein the inkjet ink composition further comprises (Component 2-D) a polyfunctional vinyl ether compound.

16. The inkjet ink composition according to claim 14, wherein Component 2-A comprises the di(meth)acrylate of a hydrocarbon diol having a branched structure having 5 to 10 carbons.

17. The inkjet ink composition according to claim 14, wherein Component 2-A comprises 3-methyl-1,5-pentanediol diacrylate.

18. The inkjet ink composition according to claim 14, wherein Component 2-B comprises cyclic trimethylolpropane formal acrylate.

19. The inkjet ink composition according to claim 14, wherein the inkjet ink composition further comprises (Component 2-E) a monofunctional (meth)acrylate compound having a chain-form hydrocarbon group having 8 to 13 carbons.

20. The inkjet ink composition according to claim 14, wherein the inkjet ink composition further comprises (Component 2-F) an N-vinyllactam.

21. An inkjet recording method comprising:
($a^1$) a step of discharging the inkjet ink composition according to claim 14 onto a recording medium; and
($b^1$) a step of curing the inkjet ink composition by irradiating the discharged inkjet ink composition with actinic radiation.

22. The inkjet recording method according to claim 21, wherein steps ($a^1$) and ($b^1$) are carried out at least twice for the same area on the recording medium.

23. A printed material formed using the inkjet recording method according to claim 22.

24. The inkjet ink composition according to claim 14, wherein the inkjet ink composition further comprises a urethane (meth)acrylate.

* * * * *